(12) United States Patent
Jiao et al.

(10) Patent No.: US 12,446,046 B2
(45) Date of Patent: Oct. 14, 2025

(54) CONFIGURATION INFORMATION INDICATION METHOD AND APPARATUS

(71) Applicant: Huawei Technologies Co., Ltd., Shenzhen (CN)

(72) Inventors: Chunxu Jiao, Shanghai (CN); Chao Li, Beijing (CN); Zhengzheng Xiang, Shanghai (CN); Lei Lu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 450 days.

(21) Appl. No.: 17/819,420

(22) Filed: Aug. 12, 2022

(65) Prior Publication Data

US 2022/0393846 A1     Dec. 8, 2022

Related U.S. Application Data

(63) Continuation of application No. PCT/CN2020/075430, filed on Feb. 14, 2020.

(51) Int. Cl.
*H04W 72/23* (2023.01)
*H04L 5/14* (2006.01)

(52) U.S. Cl.
CPC ............. *H04W 72/23* (2023.01); *H04L 5/14* (2013.01)

(58) Field of Classification Search
CPC .................................................. H04W 72/23
See application file for complete search history.

(56) References Cited

U.S. PATENT DOCUMENTS 12,126,571 B2 * 10/2024 Li .................. H04L 5/0053
2017/0230956 A1    8/2017 Kim et al.
(Continued)

FOREIGN PATENT DOCUMENTS

CN       107079508 A     8/2017
CN       109478967 A     3/2019
(Continued)

OTHER PUBLICATIONS

Huawei, et al., "Sideline synchronization mechanisms for NR V2X", 3GPP TSG RAN WG1 Meeting #99, R1-1911885, Nov. 18-22, 2019, 24 Pages, Reno, USA.
(Continued)

*Primary Examiner* — Jason E Mattis
(74) *Attorney, Agent, or Firm* — Slater Matsil, LLP

(57) ABSTRACT

This application provides a configuration information indication method and an apparatus, which are applicable to fields such as vehicle to everything V2X, intelligent connected vehicles, assisted driving, and intelligent driving, to resolve an existing-technology problem that SL transmission causes interference to DL transmission, and effectively reduce signaling overheads. This method is applied to a first terminal device, and includes: receiving an uplink-downlink time division multiplex TDD configuration sent by a network device; and sending indication information to a second terminal device based on the uplink-downlink TDD configuration, where the indication information is carried on a physical sidelink broadcast channel PSBCH of a sidelink synchronization signal block S-SSB, and the indication information is used to indicate periodicity information included in the uplink-downlink TDD configuration.

16 Claims, 8 Drawing Sheets

(56) References Cited

U.S. PATENT DOCUMENTS

| 2017/0303144 | A1 | 10/2017 | Guo et al. | |
|---|---|---|---|---|
| 2019/0373617 | A1 | 12/2019 | Sun et al. | |
| 2022/0046598 | A1* | 2/2022 | Zhao | H04W 48/12 |
| 2022/0124677 | A1* | 4/2022 | Zhao | H04W 48/12 |
| 2022/0191862 | A1* | 6/2022 | Hwang | H04W 72/0446 |
| 2022/0286222 | A1* | 9/2022 | Harada | H04L 5/0028 |

FOREIGN PATENT DOCUMENTS

| CN | 110278610 A | 9/2019 |
|---|---|---|
| CN | 110536261 A | 12/2019 |
| CN | 110771235 A | 2/2020 |
| EP | 3522430 A1 | 8/2019 |
| JP | 2018509843 A | 4/2018 |

OTHER PUBLICATIONS

Intel Corporation, "Synchronization Design for NR V2X Sidelink Communication", 3GPP TSG RAN WG1 Meeting #97, R1-1906797, May 13-17, 2019, 17 Pages, Reno, USA.

VIVO, "Sidelink synchronization mechanism", 3GPP TSG RAN WG1 Meeting #99, R1-1912024, Nov. 18-22, 2019, 19 Pages, Reno. USA.

"3rd Generation Partnership Project; Technical Specification Group Radio Access Network; NR; Physical channels and modulation (Release 16)", 3GPP TS 38.211 V16.0.0, Technical Specification, Dec. 2019, 129 Pages.

"3rd Generation Partnership Project; Technical Specification Group Radio Access Network; NR; Physical layer procedures for control (Release 16)", 3GPP TS 38.213 V16.0.0, Technical Specification, Dec. 2019, 146 Pages.

"3rd Generation Partnership Project; Technical Specification Group Radio Access Network; NR; User Equipment (UE) procedures in Idle mode and RRC Inactive state (Release 15)", 3GPP TS 38.304 V15.6.0, Technical Specification, Dec. 2019, 30 Pages.

"3rd Generation Partnership Project; Technical Specification Group Radio Access Network; NR; Radio Resource Control (RRC) protocol specification (Release 15)", 3GPP TS 38.331 V15.7.0, Technical Specification, Sep. 2019, 527 Pages.

CATT, "Design and evaluation of S-SSB for NR V2X Sidelink", 3GPP TSG RAN WG1 Ad-Hoc Meeting 1901, R1-1900322, Jan. 21-25, 2019, 14 Pages, Taipei.

CATT, "Sidelink synchronization mechanism in NR V2X", 3GPP TSG RAN WG1 Meeting #99, R1-1912156, Nov. 18-22, 2019, 15 Pages, Reno, USA.

Huawei, et al., "Sidelink synchronization mechanisms for NR V2X", 3GPP TSG RAN WG1 Ad-Hoc Meeting 1901, R1-1900025, Jan. 21-25, 2019, 12 Pages, Taipei.

Huawei, et al., "Sidelink synchronization mechanisms for NR V2X", 3GPP TSG RAN WG1 Meeting #97, R1-1906012, May 13-17, 2019, 13 Pages, Reno, USA.

Huawei, et al., "Sidelink synchronization mechanisms for NR V2X", 3GPP TSG RAN WG1 Meeting #98bis, R1-1910057, Oct. 14-20, 2019, 27 Pages, Chongqing, China.

NTT Docomo, Inc., "Sidelink synchronization mechanism for Nr V2X", 3GPP TSG RAN WG1 Ad-Hoc Meeting 1901, R1-1900964, Jan. 21-25, 2019, 5 Pages, Taipei.

OPPO, "Discussion of synchronization mechanism for NR-V2X", 3GPP TSG RAN WG1 Ad-Hoc Meeting 1901, R1-1900302, Jan. 21-25, 2019, 4 Pages, Taipei.

Sharp, "Considerations on synchronization design for NR V2X", 3GPP TSG RAN WG1 Ad-Hoc Meeting 1901, R1-1900832, Jan. 21-25, 2019, 4 Pages, Taipei, Taiwan.

Spreadtrum Communications, "Discussion on synchronization mechanism for NR V2X", 3GPP TSG RAN WG1 Meeting #98bis, R1-1910008, Oct. 14-20, 2019, 10 Pages, Chongqing, China.

Spreadtrum Communications, Discussion on synchronization mechanisms for NR V2X, 3GPP TSG RAN WG1 Ad-Hoc Meeting 1901, R1-1900712, Jan. 21-25, 2019, 5 Pages, Taipei.

VIVO, "Sidelink synchronization mechanism", 3GPP TSG RAN WG1 Meeting #99, R1-1912024, Nov. 18-22, 2019, 18 Pages, Reno, USA.

Spreadtrum Communications, Discussion on synchronization mechanism for NR V2X, 3GPP TSG RAN WG1 Meeting #99 R1-1912578, Reno, USA, Nov. 18-22, 2019, total 14 pages.

Huawei, HiSilicon, Remaining details of sidelink synchronization mechanisms, 3GPP TSG RAN WG1 Meeting #100-e R1-2000185, Feb. 24-Mar. 6, 2020, total 14 pages.

* cited by examiner

CONFIGURATION INFORMATION INDICATION METHOD AND APPARATUS

CROSS-REFERENCE TO RELATED APPLICATIONS

This application is a continuation of International Application No. PCT/CN2020/075430, filed on Feb. 14, 2020, the disclosure of which is hereby incorporated by reference in its entirety.

TECHNICAL FIELD

This application relates to the field of communication technologies, and in particular, to a configuration information indication method and an apparatus.

BACKGROUND

In a new radio (NR) system of a 5th generation (5G) mobile communication network, a 5G base station (next generation NodeB, gNB) indicates, by sending an uplink-downlink time division duplex (TDD) configuration on a Uu interface, a time allocation manner of a downlink (DL) and an uplink (UL) within a time range to UE. The UE may receive DL data from the gNB within DL transmission duration, and may send UL data to the gNB within UL transmission duration.

Data transmission on a PC5 interface and a Uu interface that are used for communication between UEs may be performed on a same carrier frequency, but sidelink (SL) transmission on the PC5 interface cannot occupy the DL transmission duration. In an existing technology, no uplink-downlink TDD configuration is indicated to the UEs. As a result, SL transmission performed between the UEs occupies the DL transmission duration because the uplink-downlink TDD configuration is not considered. This causes interference to DL transmission.

SUMMARY

Embodiments of this application provide a configuration information indication method and an apparatus, which are applicable to fields such as vehicle to everything (V2X), intelligent connected vehicles, assisted driving, and intelligent driving, to resolve an existing-technology problem that SL transmission causes interference to DL transmission.

According to a first aspect, an embodiment of this application provides a configuration information indication method, applied to a first terminal device, and including:

receiving an uplink-downlink time division duplex TDD configuration from a network device; and sending indication information to a second terminal device based on the uplink-downlink TDD configuration, where the indication information is carried on a physical sidelink broadcast channel PSBCH of a sidelink synchronization signal block S-SSB, and the indication information is used to indicate periodicity information included in the uplink-downlink TDD configuration.

In this embodiment of this application, the first terminal device indicates the uplink-downlink TDD configuration to the second terminal device through the PSBCH of the S-SSB, so that the second terminal device performs SL transmission based on the indication to avoid causing interference to DL transmission, and performs simplified indication on the uplink-downlink TDD configuration to effectively save signaling overheads.

In an optional implementation, the periodicity information includes a quantity of TDD patterns and/or a TDD pattern periodicity.

In an optional implementation, the indication information is further used to indicate UL transmission duration in the TDD pattern periodicity.

In this embodiment of this application, the UL transmission duration is indicated to the second terminal device, so that the second terminal device can perform SL transmission within the UL transmission duration, to further avoid causing interference to the DL transmission.

In an optional implementation, the indication information includes a first bit sequence, and the first bit sequence is used to indicate the TDD pattern periodicity.

In an optional implementation, the indication information includes a first bit sequence, a first part of bits in the first bit sequence are used to indicate the quantity of TDD patterns, and a second part of bits in the first bit sequence are used to indicate the TDD pattern periodicity.

In an optional implementation, the indication information includes a second bit sequence; and when the quantity of TDD patterns included in the uplink-downlink TDD configuration is 1, the second bit sequence is used to indicate UL transmission duration in a periodicity of the TDD pattern; or when the quantity of TDD patterns included in the uplink-downlink TDD configuration is N, the second bit sequence is used to indicate UL transmission duration in a periodicity of each of the N TDD patterns, where N is an integer greater than 1.

In an optional implementation, the indication information includes a second bit sequence; and when the quantity of TDD patterns included in the uplink-downlink TDD configuration is N, a first part of bits in the second bit sequence are used to indicate a first TDD pattern in the N TDD patterns, and a second part of bits in the second bit sequence are used to indicate UL transmission duration in a periodicity of the first TDD pattern.

In an optional implementation, the UL transmission duration in the periodicity of the first TDD pattern is greater than UL transmission duration in a periodicity of a second TDD pattern, and the second TDD pattern is any one of the N TDD patterns except the first TDD pattern.

In this embodiment of this application, limited bits in the first bit sequence and/or the second bit sequence are used to represent the indication information. This facilitates parsing, and can reduce signaling overheads of communication between the terminal devices.

In an optional implementation, the method further includes:

determining first UL transmission duration based on a ratio of a subcarrier spacing SCS of the S-SSB to a reference SCS included in the uplink-downlink TDD configuration, where the first UL transmission duration is UL transmission duration in a periodicity of any one of the N TDD patterns.

In this embodiment of this application, the first UL transmission duration is determined based on the SCS of the S-SSB exchanged between the terminal devices and the reference SCS in the uplink-downlink TDD configuration, instead of a manner in which reference data in the uplink-downlink TDD configuration, for example, the reference SCS or reference UL transmission duration, is directly sent to the second terminal device. This can be more flexibly applicable to actual communication, and indicate the second terminal device to perform SL transmission within the corresponding UL transmission duration, to avoid causing interference to the DL transmission.

In an optional implementation, the method further includes:

comparing a subcarrier spacing SCS of the S-SSB with an SCS threshold, where the SCS threshold is related to a quantity of bits used to indicate first UL transmission duration, and the first UL transmission duration is UL transmission duration in a periodicity of any one of the N TDD patterns; and determining the first UL transmission duration based on a result of the comparison.

In this embodiment of this application, the SCS threshold is determined by considering a quantity of bits used to indicate the UL transmission duration, so that the UL transmission duration is determined based on the SCS threshold and the SCS of the S-SSB exchanged between the terminal devices. This can be flexibly applicable to actual communication, and limited bits can be properly used to indicate the UL transmission duration, so that the second terminal device performs SL transmission within the corresponding UL transmission duration, to avoid causing interference to the DL transmission.

In an optional implementation, the determining the first UL transmission duration based on a result of the comparison includes:

when the SCS of the S-SSB is less than or equal to the SCS threshold, determining the first UL transmission duration based on a ratio of the SCS of the S-SSB to a reference SCS included in the uplink-downlink TDD configuration; or when the SCS of the S-SSB is greater than the SCS threshold, determining the first UL transmission duration based on a ratio of the SCS threshold to a reference SCS included in the uplink-downlink TDD configuration information.

In an optional implementation, the determining the first UL transmission duration based on a result of the comparison includes:

when the SCS of the S-SSB is greater than the SCS threshold, determining second UL transmission duration based on a ratio of the SCS of the S-SSB to a reference SCS included in the uplink-downlink TDD configuration information; and when the second UL transmission duration is greater than a time threshold, determining the first UL transmission duration based on the time threshold; or when the second UL transmission duration is less than or equal to a time threshold, determining the first UL transmission duration based on the second UL transmission duration, where the time threshold is maximum UL transmission duration that can be indicated by a bit used to indicate the first UL transmission duration.

In an optional implementation, the determining the first UL transmission duration based on a result of the comparison includes:

when the SCS of the S-SSB is greater than the SCS threshold, determining second UL transmission duration based on a ratio of the SCS of the S-SSB to a reference SCS included in the uplink-downlink TDD configuration;

scaling down the second UL transmission duration based on a preset step; and determining the first UL transmission duration based on scaled-down second UL transmission duration.

According to a second aspect, an embodiment of this application provides a configuration information indication method, applied to a second terminal device, and including:

receiving indication information from a first terminal device, where the indication information is carried on a physical sidelink broadcast channel PSBCH of a sidelink synchronization signal block S-SSB, and the indication information is used to indicate periodicity information included in an uplink-downlink time division duplex TDD configuration received by the first terminal device.

In this embodiment of this application, the second terminal device receives the indication information from the first terminal device, where the indication information is related to the uplink-downlink TDD configuration received by the first terminal device. In this case, the second terminal device may perform SL transmission with another terminal device based on the indication information, to avoid interference caused by SL transmission between the terminal devices to DL transmission between a network device and the terminal device.

In an optional implementation, the periodicity information includes a quantity of TDD patterns and/or a TDD pattern periodicity.

In an optional implementation, the indication information is further used to indicate UL transmission duration in the TDD pattern periodicity.

In this embodiment of this application, the second terminal device may perform SL transmission based on the UL transmission duration indicated by the indication information, to further avoid causing interference to the DL transmission.

In an optional implementation, the indication information includes a first bit sequence, and the first bit sequence is used to indicate the TDD pattern periodicity.

In an optional implementation, the indication information includes a first bit sequence, a first part of bits in the first bit sequence are used to indicate the quantity of TDD patterns, and a second part of bits in the first bit sequence are used to indicate the TDD pattern periodicity.

In an optional implementation, the indication information includes a second bit sequence; and when the quantity of TDD patterns included in the uplink-downlink TDD configuration is 1, the second bit sequence is used to indicate UL transmission duration in a periodicity of the TDD pattern; or when the quantity of TDD patterns included in the uplink-downlink TDD configuration is N, the second bit sequence is used to indicate UL transmission duration in a periodicity of each of the N TDD patterns, where N is an integer greater than 1.

In an optional implementation, the indication information includes a second bit sequence; and when the quantity of TDD patterns included in the uplink-downlink TDD configuration is N, a first part of bits in the second bit sequence are used to indicate a first TDD pattern in the N TDD patterns, and a second part of bits in the second bit sequence are used to indicate UL transmission duration in a periodicity of the first TDD pattern.

In an optional implementation, the UL transmission duration in the periodicity of the first TDD pattern is greater than UL transmission duration in a periodicity of a second TDD pattern, and the second TDD pattern is any one of the N TDD patterns except the first TDD pattern.

In this embodiment of this application, limited bits in the first bit sequence and/or the second bit sequence are used to represent the indication information. This facilitates parsing, and can reduce signaling overheads of communication between the terminal devices.

In an optional implementation, UL transmission duration in a periodicity of any one of the N TDD patterns is determined based on a ratio of a subcarrier spacing SCS of the S-SSB to a reference SCS included in the uplink-downlink TDD configuration.

In this embodiment of this application, the first UL transmission duration is determined based on the SCS of the S-SSB exchanged between the terminal devices and the reference SCS in the uplink-downlink TDD configuration, instead of a manner in which reference data in the uplink-downlink TDD configuration, for example, the reference SCS or reference UL transmission duration, is directly sent to the second terminal device. This can be more flexibly applicable to actual communication, and indicate the second terminal device to perform SL transmission within the corresponding UL transmission duration, to avoid causing interference to the DL transmission.

In an optional implementation, UL transmission duration in a periodicity of any one of the N TDD patterns is determined based on a result of comparing a subcarrier spacing SCS of the S-SSB with an SCS threshold, the SCS threshold is related to a first quantity of bits, and the first quantity of bits is a quantity of bits used to indicate the UL transmission duration in the periodicity of the TDD pattern.

In this embodiment of this application, the SCS threshold is determined by considering a quantity of bits used to indicate the UL transmission duration, so that the UL transmission duration is determined based on the SCS threshold and the SCS of the S-SSB exchanged between the terminal devices. This can be flexibly applicable to actual communication, and limited bits can be properly used to indicate the UL transmission duration, so that the second terminal device performs SL transmission within the corresponding UL transmission duration, to avoid causing interference to the DL transmission.

According to a third aspect, an embodiment of this application provides a configuration information indication apparatus, including:

a receiving module, configured to receive an uplink-downlink time division duplex TDD configuration from a network device; and a sending module, configured to send indication information to a second terminal device based on the uplink-downlink TDD configuration, where the indication information is carried on a physical sidelink broadcast channel PSBCH of a sidelink synchronization signal block S-SSB, and the indication information is used to indicate periodicity information included in the uplink-downlink TDD configuration.

In this embodiment of this application, a first terminal device indicates the uplink-downlink TDD configuration to the second terminal device through the PSBCH of the S-SSB, so that the second terminal device performs SL transmission based on the indication to avoid causing interference to DL transmission, and performs simplified indication on the uplink-downlink TDD configuration to effectively save signaling overheads.

In an optional implementation, the periodicity information includes a quantity of TDD patterns and/or a TDD pattern periodicity.

In an optional implementation, the indication information is further used to indicate UL transmission duration in the TDD pattern periodicity.

In this embodiment of this application, the UL transmission duration is indicated to the second terminal device, so that the second terminal device can perform SL transmission within the UL transmission duration, to further avoid causing interference to the DL transmission.

In an optional implementation, the indication information includes a first bit sequence, and the first bit sequence is used to indicate the TDD pattern periodicity.

In an optional implementation, the indication information includes a first bit sequence, a first part of bits in the first bit sequence are used to indicate the quantity of TDD patterns, and a second part of bits in the first bit sequence are used to indicate the TDD pattern periodicity.

In an optional implementation, the indication information includes a second bit sequence; and when the quantity of TDD patterns included in the uplink-downlink TDD configuration is 1, the second bit sequence is used to indicate UL transmission duration in a periodicity of the TDD pattern; or when the quantity of TDD patterns included in the uplink-downlink TDD configuration is N, the second bit sequence is used to indicate UL transmission duration in a periodicity of each of the N TDD patterns, where N is an integer greater than 1.

In an optional implementation, the indication information includes a second bit sequence; and when the quantity of TDD patterns included in the uplink-downlink TDD configuration is N, a first part of bits in the second bit sequence are used to indicate a first TDD pattern in the N TDD patterns, and a second part of bits in the second bit sequence are used to indicate UL transmission duration in a periodicity of the first TDD pattern.

In an optional implementation, the UL transmission duration in the periodicity of the first TDD pattern is greater than UL transmission duration in a periodicity of a second TDD pattern, and the second TDD pattern is any one of the N TDD patterns except the first TDD pattern.

In this embodiment of this application, limited bits in the first bit sequence and/or the second bit sequence are used to represent the indication information. This facilitates parsing, and can reduce signaling overheads of communication between the terminal devices.

In an optional implementation, the apparatus further includes:

a processing module, configured to determine first UL transmission duration based on a ratio of a subcarrier spacing SCS of the S-SSB to a reference SCS included in the uplink-downlink TDD configuration, where the first UL transmission duration is UL transmission duration in a periodicity of any one of the N TDD patterns.

In this embodiment of this application, the first UL transmission duration is determined based on the SCS of the S-SSB exchanged between the terminal devices and the reference SCS in the uplink-downlink TDD configuration, instead of a manner in which reference data in the uplink-downlink TDD configuration, for example, the reference SCS or reference UL transmission duration, is directly sent to the second terminal device. This can be more flexibly applicable to actual communication, and indicate the second terminal device to perform SL transmission within the corresponding UL transmission duration, to avoid causing interference to the DL transmission.

In an optional implementation, the apparatus further includes:

a processing module, configured to: compare a subcarrier spacing SCS of the S-SSB with an SCS threshold, where the SCS threshold is related to a quantity of bits used to indicate first UL transmission duration, and the first UL transmission duration is UL transmission duration in a periodicity of any one of the N TDD patterns; and determine the first UL transmission duration based on a result of the comparison.

In this embodiment of this application, the SCS threshold is determined by considering a quantity of bits used to indicate the UL transmission duration, so that the UL transmission duration is determined based on the SCS threshold and the SCS of the S-SSB exchanged between the terminal devices. This can be flexibly applicable to actual communication, and limited bits can be properly used to indicate the UL transmission duration, so that the second terminal device performs SL transmission within the corresponding UL transmission duration, to avoid causing interference to the DL transmission.

In an optional implementation, the processing module is further configured to:

when the SCS of the S-SSB is less than or equal to the SCS threshold, determine the first UL transmission duration based on a ratio of the SCS of the S-SSB to a reference SCS included in the uplink-downlink TDD configuration; or when the SCS of the S-SSB is greater than the SCS threshold, determine the first UL transmission duration based on a ratio of the SCS threshold to a reference SCS included in the uplink-downlink TDD configuration information.

In an optional implementation, the processing module is further configured to:

when the SCS of the S-SSB is greater than the SCS threshold, determine second UL transmission duration based on a ratio of the SCS of the S-SSB to a reference SCS included in the uplink-downlink TDD configuration information; and when the second UL transmission duration is greater than a time threshold, determine the first UL transmission duration based on the time threshold; or when the second UL transmission duration is less than or equal to a time threshold, determine the first UL transmission duration based on the second UL transmission duration, where the time threshold is maximum UL transmission duration that can be indicated by a bit used to indicate the first UL transmission duration.

In an optional implementation, the processing module is further configured to:

when the SCS of the S-SSB is greater than the SCS threshold, determine second UL transmission duration based on a ratio of the SCS of the S-SSB to a reference SCS included in the uplink-downlink TDD configuration;

scale down the second UL transmission duration based on a preset step; and determine the first UL transmission duration based on scaled-down second UL transmission duration.

According to a fourth aspect, an embodiment of this application provides a configuration information indication apparatus, including:

a receiving module, configured to receive indication information from a first terminal device, where the indication information is carried on a physical sidelink broadcast channel PSBCH of a sidelink synchronization signal block S-SSB, and the indication information is used to indicate periodicity information included in an uplink-downlink time division duplex TDD configuration received by the first terminal device.

In this embodiment of this application, a second terminal device receives the indication information from the first terminal device, where the indication information is related to the uplink-downlink TDD configuration received by the first terminal device. In this case, the second terminal device may perform SL transmission with another terminal device based on the indication information, to avoid interference caused by SL transmission between the terminal devices to DL transmission between a network device and the terminal device.

In an optional implementation, the periodicity information includes a quantity of TDD patterns and/or a TDD pattern periodicity.

In an optional implementation, the indication information is further used to indicate UL transmission duration in the TDD pattern periodicity.

In this embodiment of this application, the second terminal device may perform SL transmission based on the UL transmission duration indicated by the indication information, to avoid causing interference to the DL transmission.

In an optional implementation, the indication information includes a first bit sequence, and the first bit sequence is used to indicate the TDD pattern periodicity.

In an optional implementation, the indication information includes a first bit sequence, a first part of bits in the first bit sequence are used to indicate the quantity of TDD patterns, and a second part of bits in the first bit sequence are used to indicate the TDD pattern periodicity.

In an optional implementation, the indication information includes a second bit sequence; and when the quantity of TDD patterns included in the uplink-downlink TDD configuration is 1, the second bit sequence is used to indicate UL transmission duration in a periodicity of the TDD pattern; or when the quantity of TDD patterns included in the uplink-downlink TDD configuration is N, the second bit sequence is used to indicate UL transmission duration in a periodicity of each of the N TDD patterns, where N is an integer greater than 1.

In an optional implementation, the indication information includes a second bit sequence; and when the quantity of TDD patterns included in the uplink-downlink TDD configuration is N, a first part of bits in the second bit sequence are used to indicate a first TDD pattern in the N TDD patterns, and a second part of bits in the second bit sequence are used to indicate UL transmission duration in a periodicity of the first TDD pattern.

In an optional implementation, the UL transmission duration in the periodicity of the first TDD pattern is greater than UL transmission duration in a periodicity of a second TDD pattern, and the second TDD pattern is any one of the N TDD patterns except the first TDD pattern.

In this embodiment of this application, limited bits in the first bit sequence and/or the second bit sequence are used to represent the indication information. This facilitates parsing, and can reduce signaling overheads of communication between the terminal devices.

In an optional implementation, UL transmission duration in a periodicity of any one of the N TDD patterns is determined based on a ratio of a subcarrier spacing SCS of the S-SSB to a reference SCS included in the uplink-downlink TDD configuration.

In this embodiment of this application, the first UL transmission duration is determined based on the SCS of the S-SSB exchanged between the terminal devices and the reference SCS in the uplink-downlink TDD configuration, instead of a manner in which reference data in the uplink-downlink TDD configuration, for example, the reference SCS or reference UL transmission duration, is directly sent to the second terminal device. This can be more flexibly applicable to actual communication, and indicate the second terminal device to perform SL transmission within the corresponding UL transmission duration, to avoid causing interference to the DL transmission.

In an optional implementation, UL transmission duration in a periodicity of any one of the N TDD patterns is determined based on a result of comparing a subcarrier spacing SCS of the S-SSB with an SCS threshold, the SCS threshold is related to a first quantity of bits, and the first quantity of bits is a quantity of bits used to indicate the UL transmission duration in the periodicity of the TDD pattern.

In this embodiment of this application, the SCS threshold is determined by considering a quantity of bits used to indicate the UL transmission duration, so that the UL transmission duration is determined based on the SCS threshold and the SCS of the S-SSB exchanged between the terminal devices. This can be flexibly applicable to actual communication, and limited bits can be properly used to indicate the UL transmission duration, so that the second terminal device performs SL transmission within the corresponding UL transmission duration, to avoid causing interference to the DL transmission.

According to a fifth aspect, an embodiment of this application provides a communication apparatus, including a processor and a memory, where the memory is configured to store a computer program; and the processor is configured to execute the computer program stored in the memory, to enable the communication apparatus to perform the method in any possible implementation in the first aspect, or perform the method in any possible implementation in the second aspect.

According to a sixth aspect, an embodiment of this application provides a communication apparatus, including a processor and an interface circuit, where the interface circuit is configured to receive code instructions and transmit the code instructions to the processor, and the processor is configured to run the code instructions to perform the method in any possible implementation in the first aspect, or perform the method in any possible implementation in the second aspect.

According to a seventh aspect, an embodiment of this application provides a readable storage medium, storing instructions, where when the instructions are executed, the method in any possible implementation in the first aspect is implemented, or the method in any possible implementation in the second aspect is implemented.

According to an eighth aspect, an embodiment of this application provides a computer program product, including computer program code, where when the computer program code is run by a processor of a communication apparatus, the communication apparatus is enabled to perform the method in any possible implementation in the first aspect or the method in any possible implementation in the second aspect.

According to a ninth aspect, an embodiment of this application provides a communication system, including the configuration information indication apparatus in the third aspect and the configuration information indication apparatus in the fourth aspect.

DETAILED DESCRIPTION OF ILLUSTRATIVE EMBODIMENTS

Figure 1:
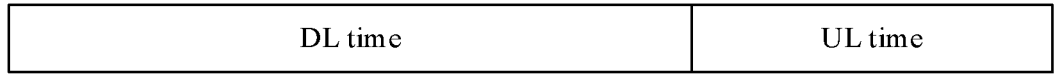
FIG. 1 is a schematic diagram of time allocation according to an embodiment of this application.

To make the objectives, technical solutions, and advantages of this application clearer, the following further describes this application in detail with reference to the accompanying drawings. It is clear that the described embodiments are merely some but not all of embodiments of this application. All other embodiments obtained by a person of ordinary skill in the art based on the embodiments of this application without creative efforts shall fall within the protection scope of this application.

Embodiments of this application provide a configuration information indication method and an apparatus, to resolve an existing-technology problem that SL transmission causes interference to DL transmission. Because problem-resolving principles of the method and the apparatus are the same, mutual reference may be made to method embodiments and apparatus embodiments, and repeated descriptions are not provided.

Some terms in this application are described below, to help a person skilled in the art have a better understanding.

(1) Network Device

The network device may be a base station or an access node (AN), and provides a wireless access service for a terminal. The network device may be specifically a base transceiver station (BTS) in a global system for mobile communications (GSM) or a code division multiple access (CDMA) system, may be a base station (NodeB) in a wideband code division multiple access (WCDMA) system, or may be a base station device (gNB), a small cell device, a radio access point (Wi-Fi AP), a worldwide interoperability for microwave access base station (WiMAX BS), or the like in a 5G network. This is not limited in this application.

(2) Terminal Device

The terminal device is also referred to as a terminal, user equipment (UE), a mobile station (MS), a mobile terminal (MT), or the like, and is a device that provides a user with voice and/or data connectivity, for example, a handheld device having a wireless connection function, a vehicle-mounted device, a wearable device, a computing device, or another processing device connected to a wireless modem, or user equipment in various forms. The terminal device includes but is not limited to: a station (STA), a mobile station (MS), a subscriber unit (SU), a personal computer (PC), a laptop computer (LC), a tablet computer (TC), a netbook, a terminal, a personal digital assistant (PDA), a mobile Wi-Fi hotspot device (MiFi device), a smartwatch, smart glasses, or the like. The foregoing terminal devices may be distributed in an entire network. For ease of description, in this application, the terminal devices are referred to as a terminal device or UE for short.

(3) Time Division Duplex and Uplink-Downlink Time Division Duplex Configuration

Time division duplex (TDD) is a duplex mode widely used in wireless communication. Based on this, downlink (DL) transmission and uplink (UL) transmission on a communication interface used for communication between a network device and a terminal device, namely, a Uu interface, may be performed on a same carrier frequency in a time division manner.

To implement low-latency transmission, especially to adapt to an ultra-low latency requirement of an ultra-reliable low-latency communication (URLLC) service, a 5G base station (next generation NodeB, gNB) sends an uplink-downlink TDD configuration on the Uu interface, to indicate a time allocation manner of a DL and a UL within a time range to UK FIG. 1 is a schematic diagram of time allocation. The UE may frequently perform uplink-downlink switching based on the uplink-downlink TDD configuration, may receive DL data from the gNB in DL time, and may send UL data to the gNB in UL time.

The uplink-downlink TDD configuration is classified into a cell-level uplink-downlink TDD configuration and a UE-level uplink-downlink TDD configuration. The cell-level uplink-downlink TDD configuration is applicable to all UEs within a coverage area of the gNB. The cell-level uplink-downlink TDD configuration indicates a quantity of DL slots and a quantity of UL slots at a slot granularity, and indicates a quantity of DL symbols and a quantity of UL symbols at an orthogonal frequency division multiplexing (OFDM) symbol granularity. The UE-level uplink-downlink TDD configuration is applicable to UE within the coverage area of the gNB. On the basis of the cell-level uplink-downlink TDD configuration, a configurable slot is further used. To be specific, in addition to a DL slot represented by D and a UL slot represented by U, a configurable slot represented by F is further used. A granularity of an uplink-downlink TDD configuration in the configurable slot is an OFDM symbol. To be specific, different symbols in a same slot may be in different uplink and downlink states. All OFDM symbols in the configurable slot may be configured as UL symbols or DL symbols.

The gNB sends a corresponding uplink-downlink TDD configuration to UE by using radio resource control (RRC) signaling. Specifically, the gNB provides an indication for UE within the coverage area of the gNB or within a cell by using an information element TDD-UL-DL-ConfigCommon in the RRC signaling. As described in the 3GPP 38.331 V15.7.0 standard, indication content of the information element TDD-UL-DL-ConfigCommon is as follows:

```
TDD-UL-DL-ConfigCommon: : =       SEQUENCE{
   referenceSubcarrierSpacing   SubcarrierSpacing,
      pattern1      TDD-UL-DL-Pattern,
      pattern2      TDD-UL-DL-Pattern     OPTIONAL, --Need R
   ...
}
```

The information element TDD-UL-DL-ConfigCommon further includes two information elements or three information elements, which are explained as follows:

① referenceSubcarrierSpacing provides a reference sub-carrier spacing (SCS) 15 kHz $\cdot 2^{\mu_{ref}}$, and a value thereof may be one of the following: 15 kHz, 30 kHz, 60 kHz, 120 kHz, or 240 kHz. In the uplink-downlink TDD configuration, the reference SCS is used to determine a time boundary of DL transmission and UL transmission. The reference SCS may be different from an actual SCS used for data transmission on the Uu interface, and the reference SCS cannot be greater than an actually configured SCS used for any data transmission on the Uu interface.

② pattern1 provides one TDD pattern of the uplink-downlink TDD configuration, where pattern1 continues to point to the information element TDD-UL-DL-Pattern, and the information element TDD-UL-DL-Pattern provides a specific parameter of pattern1.

③ pattern2 is an optional information element. When the information element TDD-UL-DL-ConfigCommon does not include this information element, it indicates that the uplink-downlink TDD configuration includes only one TDD pattern: pattern1. When the information element TDD-UL-DL-ConfigCommon includes the information element pattern2, it indicates that the uplink-downlink TDD configuration is jointly determined by two TDD patterns: pattern1 and pattern2, where pattern2 continues to point to the information element TDD-UL-DL-Pattern, and the information element TDD-UL-DL-Pattern provides a specific parameter of pattern2.

Both pattern1 and pattern2 continue to point to the information element TDD-UL-DL-Pattern. As described in the 3GPP 38.331 V15.7.0 standard, indication content of the information element TDD-UL-DL-Pattern is as follows:

```
TDD-UL-DL-Pattern: : =       SEQUENCE {
   dl-UL-TransmissionPeriodicity    ENUMERATED{ms0p5, ms0p625, ms1, ms1p25,
ms2, ms2p5, ms5, ms10},
      nrofDownlinkSlots        INTEGER (0...maxNrofSlots),
```

```
    nrofDownlinkSymbols     INTEGER (0...maxNrofSymbols-1),
    nrofDownlinkSlots       INTEGER (0...maxNrofSlots),
    nrofUplinkSymbols       INTEGER (0...maxNrofSymbols-1),
    ...,
    [[
    dl-UL-TransmissionPeriodicity-v1530 ENUMERATED{ms3, ms4} OPTIONAL,  -
-Need R
    ]]
}
```

The information element TDD-UL-DL-Pattern further includes five information elements or six information elements, which are explained as follows:

① dl-UL-TransmissionPeriodicity is represented as P ms, and used to indicate a periodicity of one pattern in the uplink-downlink TDD configuration. A value thereof may be one of the following: 0.5 ms, 0.625 ms, 1 ms, 1.25 ms, 2 ms, 2.5 ms, 5 ms, or 10 ms. If the information element dl-UL-TransmissionPeriodicity-v1530 is additionally configured in the information element TDD-UL-DL-Pattern, the UE ignores indication content of the information element dl-UL-TransmissionPeriodicity.

② nrofDownlinkSlots is represented as $d_{slots}$, and used to indicate a quantity of DL slots in one pattern in the uplink-downlink TDD configuration. A value thereof may be an integer from 0 to 320.

③ nrofDownlinkSymbols is represented as $d_{sym}$, and used to indicate a quantity of DL symbols in one TDD pattern in the uplink-downlink TDD configuration. A value thereof may be an integer from 0 to 13.

④ nrofUplinkSlots is represented as $u_{slots}$, and used to indicate a quantity of UL slots in one TDD pattern in the uplink-downlink TDD configuration. A value thereof may be an integer from 0 to 320.

④ nrofUplinkSymbols is represented as $u_{sym}$, and used to indicate a quantity of UL symbols in one TDD pattern in the uplink-downlink TDD configuration. A value thereof may be an integer from 0 to 13.

⑦ dl-UL-TransmissionPeriodicity-v1530 is an optional information element, and a value thereof may be 3 ms or 4 ms. When the information element TDD-UL-DL-Pattern does not include the information element dl-UL-TransmissionPeriodicity-v1530, the UE determines a periodicity of one pattern in the uplink-downlink TDD configuration by using the information element dl-UL-TransmissionPeriodicity; or when the information element TDD-UL-DL-Pattern includes the information element dl-UL-TransmissionPeriodicity-v1530, the UE ignores content of the information element dl-UL-TransmissionPeriodicity, and determines a periodicity of one TDD pattern in the uplink-downlink TDD configuration by using the information element dl-UL-TransmissionPeriodicity-v1530.

Figure 2:
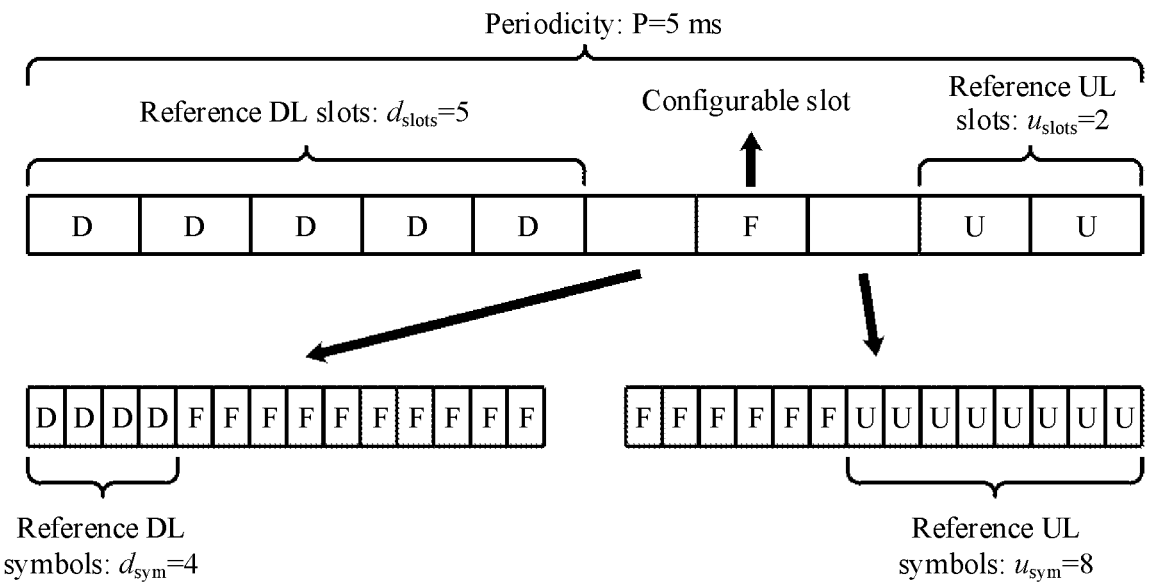
FIG. 2 is a schematic diagram of an uplink-downlink TDD configuration according to an embodiment of this application.

According to a specification of a slot configuration period provided in the 3GPP 38.213 V16.0.0 standard, the foregoing parameters P, $d_{slots}$, $d_{sym}$, $u_{slots}$, and $u_{sym}$ are used as follows: In one TDD pattern included in the uplink-downlink TDD configuration, based on the reference SCS (namely, 15 kHz·$2^{\mu ref}$), within the slot configuration period P ms, S=P·$2^{\mu ref}$ reference slots are included. In the S reference slots, first $d_{slots}$ slots are DL slots, and last $u_{slots}$ slots are UL slots. $d_{sym}$ symbols following the first $d_{slots}$ slots are DL symbols, $u_{sym}$ symbols previous to the last $u_{slots}$ slots are UL symbols, and remaining (S−$d_{slots}$−$u_{slots}$)·$N_{symb}^{slot}$−$d_{sym}$−$u_{sym}$ symbols are configurable symbols. $N_{symb}^{slot}$ represents a quantity of OFDM symbols in one slot. When a normal cyclic prefix (NCP) is used, $N_{symb}^{slot}$=14. When an extended cyclic prefix (ECP) is used, $N_{symb}^{slot}$=12. For ease of understanding, FIG. 2 is a schematic diagram of an uplink-downlink TDD configuration according to an embodiment of this application. FIG. 2 specifically shows a periodicity of a TDD pattern in the uplink-downlink TDD configuration and a time allocation manner in the periodicity, which are as follows: The reference SCS indicated by the information element TDD-UL-DL-ConfigCommon is 30 kHz, and only an information element pattern1 is included. Values of parameters in the information element TDD-UL-DL-Pattern corresponding to pattern1 are P=5 ms, $d_{slots}$=5, $d_{sym}$=4, $u_{slots}$=2, and $u_{sym}$=8.

In addition, it should be noted that, when the information element TDD-UL-DL-ConfigCommon includes both pattern1 and pattern2, a total periodicity of the uplink-downlink TDD configuration is a sum of two periodicities, namely, (P+$P_2$) ms, where $P_2$ represents a periodicity indicated by the information element TDD-UL-DL-Pattern corresponding to pattern2. Within the total periodicity, an uplink-downlink TDD configuration corresponding to pattern1 is used in first P ms, and an uplink-downlink TDD configuration corresponding to pattern2 is used in last $P_2$ ms. A manner of configuring quantities of uplink and downlink slots and quantities of uplink and downlink symbols in a single periodicity is the same as that described above. Details are not described herein again.

(4) Slot and Subcarrier Spacing

A slot is a time unit used in transmission of DL data, UL data, or SL data. Optionally, the slot includes 14 or 12 OFDM symbols. In the 5G NR system, for different subcarrier spacings (SCSs), one frame also includes different quantities of slots. It is assumed that one frame is specified to be 10 ms and the NCP is used. In this case, when the SCS is 15 kHz, a frame of 10 ms includes 10 slots, and a single slot corresponds to 1 ms;

when the SCS is 30 kHz, a frame of 10 ms includes 20 slots, and a single slot corresponds to 0.5 ms;

when the SCS is 60 kHz, a frame of 10 ms includes 40 slots, and a single slot corresponds to 0.25 ms; or when the SCS is 120 kHz, a frame of 10 ms includes 80 slots, and a single slot corresponds to 0.125 ms.

If the ECP is used, only the following case is supported: The SCS is 60 kHz, a frame of 10 ms includes 40 slots, and a single slot corresponds to 0.25 ms.

(5) The term "and/or" in embodiments of this application describes only an association relationship between associated objects and represents that three relationships may exist. For example, A and/or B may represent the following three cases: Only A exists, both A and B exist, and only B exists. The symbol "/" usually indicates an "or" relationship between the associated objects. "A plurality of" means two or more than two. In addition, it should be understood that, in the descriptions of embodiments of this application, terms such as "first" and "second" are merely intended for a purpose of differentiated description, and should not be construed as an indication or an implication of relative importance, or an indication or an implication of a sequence.

The following further describes in detail embodiments of this application with reference to the accompanying drawings.

Figure 3:
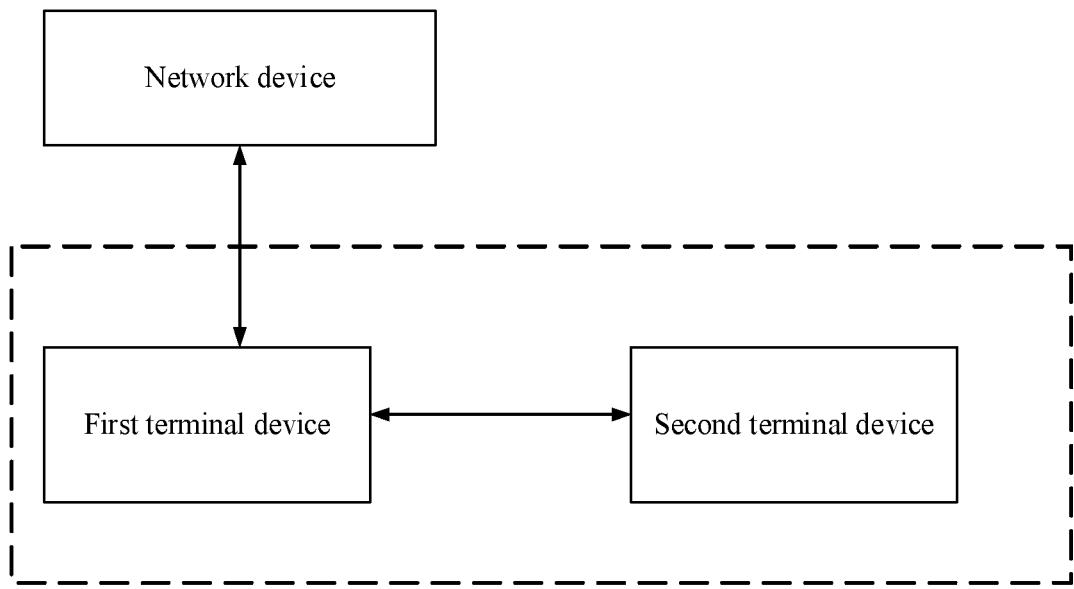
FIG. 3 is a schematic diagram of an architecture of a communication system according to an embodiment of this application.

First, FIG. 3 shows an example of an architecture of a communication system. The communication system includes a first terminal device and a second terminal device.

The first terminal device is configured to: receive an uplink-downlink TDD configuration from a network device (for example, the foregoing gNB), and indicate the uplink-downlink TDD configuration to the second terminal device.

The second terminal device is configured to determine, based on an indication of the first terminal device, duration that can be used for sidelink (SL) transmission.

In this embodiment of this application, the first terminal device indicates, to the second terminal device, the uplink-downlink TDD configuration received by the first terminal device, to avoid interference caused by SL transmission between the terminal devices to DL transmission between the network device and the terminal device. In addition, FIG. 3 further shows the network device.

In this embodiment of this application, indicating UL transmission duration may also be understood as indicating SL transmission duration. This is not limited herein.

In an optional implementation, the second terminal device may further send the indication of the first terminal device to another terminal device.

In an optional implementation, the first terminal device may directly indicate the uplink-downlink TDD configuration to the second terminal device by sending a radio signal to the second terminal device. In another optional implementation, the first terminal device may indirectly indicate the uplink-downlink TDD configuration to the second terminal device via an intermediate device. To be specific, the first terminal device first sends the radio signal to the intermediate device to indicate the uplink-downlink TDD configuration to the intermediate device, and the intermediate device forwards related indication information of the uplink-downlink TDD configuration to the second terminal device.

In an optional implementation, the first terminal device may be an edge device within a coverage area of the network device, and the second terminal device may be a device that can directly or indirectly perform wireless communication with the first terminal device and that is located outside the coverage area of the network device, to avoid interference caused by SL transmission between the edge device and the device outside the coverage area to DL transmission within the coverage area.

In an optional implementation, the first terminal device may send, to the second terminal device through a PC5 interface, a sidelink synchronization signal block (S-SSB) carrying the related indication information of the uplink-downlink TDD configuration. Based on this, this embodiment of this application may be applied to an S-SSB sending and receiving scenario in an SL scenario. The SL scenario includes a vehicle to everything (V2X) communication scenario, a device-to-device (D2D) communication scenario, and the like. It should be noted that the S-SSB may also be referred to as a sidelink synchronization signal/physical sidelink broadcast channel block (S-SS/PSBCH block).

Figure 4:
FIG. 4 is a schematic diagram of an application scenario according to an embodiment of this application.

For ease of understanding, in embodiments of this application, a schematic diagram of an application scenario is specifically provided by using a vehicle to vehicle (V2V) scenario in vehicle to everything communication as an example. As shown in FIG. 4, the scenario includes transmit end UE (namely, the foregoing first terminal device) and receive end UE (namely, the foregoing second terminal device). An example in which both the transmit end UE and the receive end UE are vehicle UEs is used in FIG. 4. It should be noted that the transmit end UE and the receive end UE in an actual application scenario may be terminal devices in any form. This is not limited herein.

The transmit end UE is a transmit entity of an S-SSB in the SL scenario. By sending the S-SSB, the transmit end UE may enable another terminal device to implement time synchronization with the transmit end UE, to implement an SL communication function. In addition, the transmit end UE further transmits related indication information of an uplink-downlink TDD configuration by sending the S-SSB.

The receive end UE is a receive entity of the S-SSB in the SL scenario. By receiving the S-SSB, the receive end UE may enable another terminal device to implement time synchronization with the receive end UE, to implement an SL communication function. In addition, the receive end UE may parse the related indication information of the uplink-downlink TDD configuration transmitted in the S-SSB. When performing SL transmission, the receive end UE may avoid interference to DL transmission based on the related indication information of the uplink-downlink TDD configuration.

Figure 5:
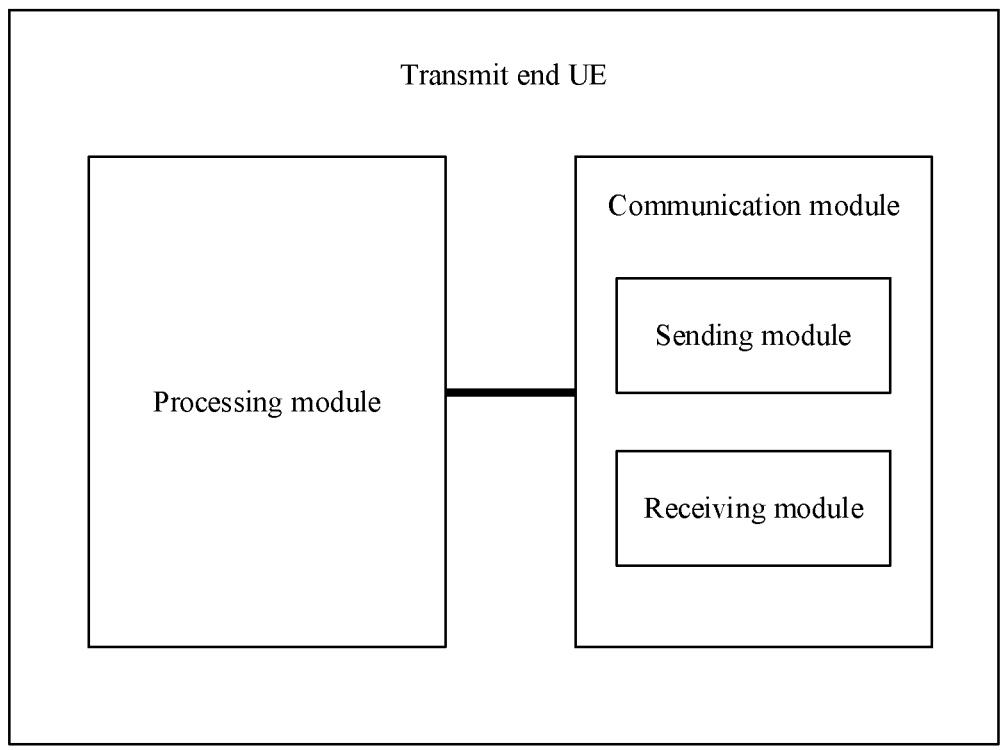
FIG. 5 is a diagram of hardware modules of transmit end UE according to an embodiment of this application.
Figure 6:
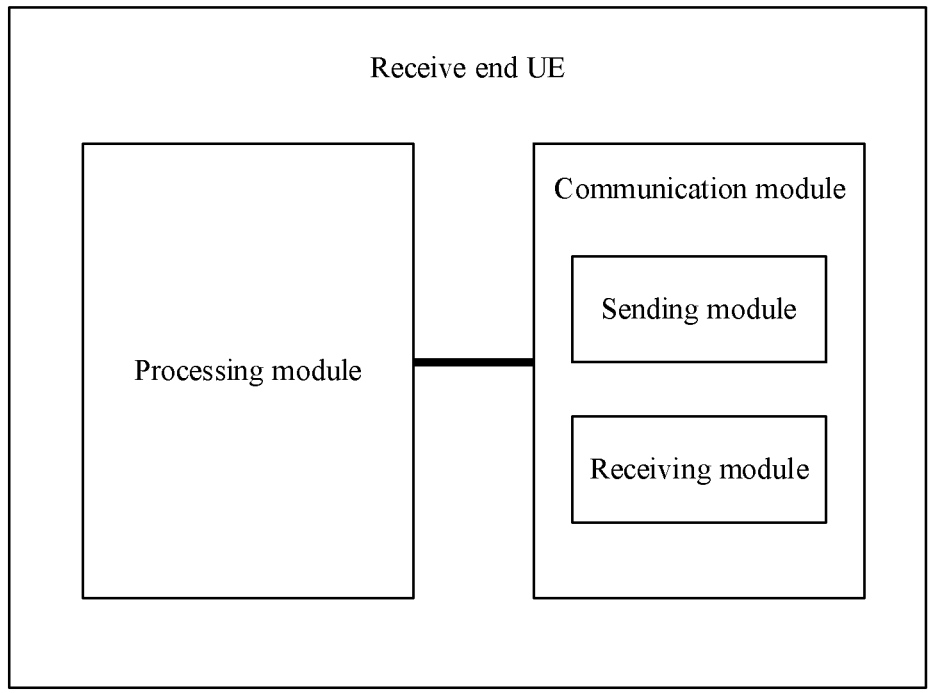
FIG. 6 is a diagram of hardware modules of receive end UE according to an embodiment of this application.

Specifically, FIG. 5 is a diagram of hardware modules of transmit end UE, and the transmit end UE includes a processing module and a communication module. The processing module is configured to process an algorithm, software, a program, storage, and the like used in a communication process. The communication module includes a sending module and a receiving module. The sending module is configured to send a radio signal, such as an S-SSB, SL data, or UL data. The receiving module is configured to receive a radio signal, such as an S-SSB, SL data, or DL data. FIG. 6 is a diagram of hardware modules of receive end UE. The receive end UE includes a processing module and a communication module. The processing module is configured to process an algorithm, software, a program, storage, and the like used in a communication process. The communication module includes a sending module and a receiving module. The sending module is configured to send a radio signal, such as an S-SSB or SL data. The receiving module is configured to receive a radio signal, such as an S-SSB or SL data.

Further, considering that the network device indicates the uplink-downlink TDD configuration to the first terminal device by using RRC signaling, signaling overheads of an information element TDD-UL-DL-ConfigCommon are large. If the first terminal device directly sends the uplink-downlink TDD configuration to another UE, for example, the second terminal device, large signaling overheads are also generated. Optionally, in embodiments of this application, a brief configuration may be indicated to the another UE based on the uplink-downlink TDD configuration, to ensure that the another UE performs SL transmission based on the indication, to avoid causing interference to DL transmission. Details are as follows.

Figure 7:
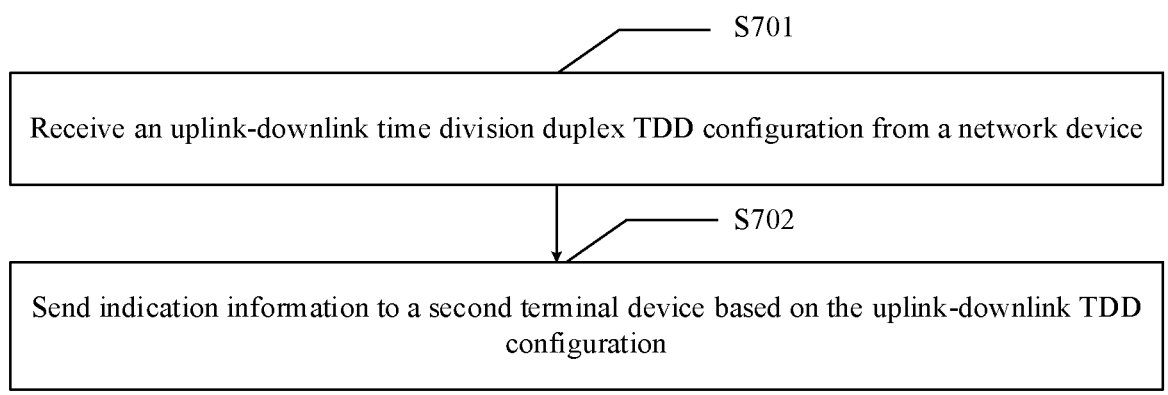
FIG. 7 is a schematic flowchart of a configuration information indication method according to an embodiment of this application.

Refer to FIG. 7. An embodiment of this application provides a configuration information indication method. The method is applied to a first terminal device, and includes the following steps.

Step S701: Receive an uplink-downlink time division duplex TDD configuration from a network device.

Step S702: Send indication information to a second terminal device based on the uplink-downlink TDD configuration, where the indication information is carried on a physical sidelink broadcast channel PSBCH of a sidelink synchronization signal block S-SSB, and the indication information is used to indicate periodicity information included in the uplink-downlink TDD configuration.

In this embodiment of this application, when indicating the uplink-downlink TDD configuration through the PSBCH of the S-SSB, the first terminal device also performs simplified indication on the uplink-downlink TDD configuration, that is, indicates the periodicity information included in the uplink-downlink TDD configuration. This can reduce signaling overheads in comparison with a case in which the uplink-downlink TDD configuration is directly sent.

In an optional implementation, the indication information is further used to indicate UL transmission duration in a TDD pattern periodicity, to indicate to the second terminal device to perform SL transmission within the UL transmission duration, so as to avoid interference caused because the SL transmission occupies DL transmission duration. The UL transmission duration includes a quantity of UL slots and/or a quantity of UL symbols.

In an optional implementation, the indication information may be specifically carried in a PSBCH payload of the sidelink synchronization signal block S-SSB. During specific implementation, some bits in the PSBCH payload may be used to carry the indication information. For example, W bits in the PSBCH payload are used to carry the indication information. An X-bit bit sequence in the W bits is used to indicate the periodicity information, and a Y-bit bit sequence in the W bits is used to indicate the UL transmission duration, where W is an integer greater than or equal to 0, X is an integer greater than or equal to 0 and less than or equal to W, and Y is an integer greater than or equal to 0 and less than or equal to W.

In an optional implementation, the periodicity information includes a quantity of TDD patterns and/or the TDD pattern periodicity, where the quantity of TDD patterns is one or more, and the TDD pattern periodicity includes a periodicity of each of the one or more TDD patterns.

In an optional implementation, the indication information includes a first bit sequence, and the first bit sequence corresponds to the periodicity information. For a specific indication manner, refer to the following two implementations.

First Implementation

A first part of bits in the first bit sequence are used to indicate the quantity of TDD patterns, and a second part of bits in the first bit sequence are used to indicate the TDD pattern periodicity, where the TDD pattern periodicity is related to the quantity of TDD patterns. For example, based on indication content of an information element TDD-UL-DL-ConfigCommon in the 3GPP 38.331V15.7.0 standard, if the uplink-downlink TDD configuration includes only pattern1, it indicates that the quantity of TDD patterns is 1, and the TDD pattern periodicity includes only the periodicity of pattern1; or if the uplink-downlink TDD configuration includes pattern1 and pattern2, it indicates that the quantity of TDD patterns is 2, and the TDD pattern periodicity includes the periodicity of pattern1 and the periodicity of pattern2. That is, when a value of the quantity of TDD patterns is 1 or 2, whether the uplink-downlink TDD configuration includes pattern2 may be determined based on an indication of the first part of bits.

During specific implementation, a periodicity index table may be configured in the first terminal device and the second terminal device, and a value is assigned to the second part of bits in the first bit sequence based on an index corresponding to the TDD pattern periodicity, to indicate the TDD pattern periodicity.

For ease of understanding, a periodicity included in an information element TDD-UL-DL-Pattern in the 3GPP 38.331V15.7.0 standard is used as an example below for description:

Optionally, the first part of bits in the first bit sequence include 1 bit. If a value of the 1 bit is 0, it indicates that the quantity of TDD patterns included in the uplink-downlink TDD configuration is 1, that is, the uplink-downlink TDD configuration includes only pattern1; or if a value of the 1 bit is 1, it indicates that the quantity of TDD patterns included in the uplink-downlink TDD configuration is 2, that is, the uplink-downlink TDD configuration includes pattern1 and pattern2. Alternatively, if the value of the 1 bit is 1, it indicates that the quantity of TDD patterns included in the uplink-downlink TDD configuration is 1, that is, the uplink-downlink TDD configuration includes only pattern1; or if the value of the 1 bit is 0, it indicates that the quantity of TDD patterns included in the uplink-downlink TDD configuration is 2, that is, the uplink-downlink TDD configuration includes pattern1 and pattern2.

Optionally, the remaining bits in the first bit sequence except the 1 bit are used as the second part of bits, and are used to indicate the periodicity of pattern1, or the periodicity of pattern1 and the periodicity of pattern2.

For example, if the first bit sequence is the foregoing X-bit bit sequence in the PSBCH payload, 1 bit in the X bits is used to indicate the quantity of TDD patterns, and X−1 bits are used to indicate one or two periodicities in the uplink-downlink TDD configuration. When the quantity of TDD patterns is 1, the X−1 bits indicate one periodicity in the uplink-downlink TDD configuration, namely, the periodicity of pattern1; or when the quantity of TDD patterns is 2, the X−1 bits indicate two periodicities in the uplink-downlink TDD configuration, namely, the periodicity of pattern1 and the periodicity of pattern2.

For example, when the quantity of TDD patterns is 1, the X−1 bits may be used to indicate one periodicity in a periodicity range {0.5 ms, 0.625 ms, 1 ms, 1.25 ms, 2 ms, 2.5 ms, 3 ms, 4 ms, 5 ms, 10 ms}. Alternatively, when two optional periodicities 3 ms and 4 ms are not considered, the X−1 bits may be used to indicate one periodicity in a periodicity range {0.5 ms, 0.625 ms, 1 ms, 1.25 ms, 2 ms, 2.5 ms, 5 ms, 10 ms}. Specifically, one periodicity may be indicated by using tables shown in Table 1 and Table 2.

A periodicity range shown in Table 1 is {0.5 ms, 0.625 ms, 1 ms, 1.25 ms, 2 ms, 2.5 ms, 3 ms, 4 ms, 5 ms, 10 ms}, and one number (namely, the foregoing index) is indicated by using X−1 bits, that is, one periodicity is indicated. Details are as follows:

TABLE 1

| Number | Periodicity P (ms) |
| --- | --- |
| 0 | 0.5 |
| 1 | 0.625 |
| 2 | 1 |
| 3 | 1.25 |
| 4 | 2 |
| 5 | 2.5 |
| 6 | 3 |
| 7 | 4 |

TABLE 1-continued

| Number | Periodicity P (ms) |
|---|---|
| 8 | 5 |
| 9 | 10 |
| 10 to 15 | Reserved |

A periodicity range shown in Table 2 is {0.5 ms, 0.625 ms, 1 ms, 1.25 ms, 2 ms, 2.5 ms, 5 ms, 10 ms}, and one number (namely, the foregoing index) is indicated by using X−1 bits, that is, one periodicity is indicated. Details are as follows:

TABLE 2

| Number | Periodicity P (ms) |
|---|---|
| 0 | 0.5 |
| 1 | 0.625 |
| 2 | 1 |
| 3 | 1.25 |
| 4 | 2 |
| 5 | 2.5 |
| 6 | 5 |
| 7 | 10 |
| 8 to 15 | Reserved |

It should be noted that correspondences between the numbers and the periodicities in Table 1 and Table 2 are not limited. In addition, an actually used periodicity may be one row or several rows shown in the tables, all rows in the tables, or more rows than the rows shown in the tables. Optionally, a value of X is 5.

For example, when the quantity of TDD patterns is 2, the X−1 bits may be used to indicate a combination of two periodicities. It is stipulated in the NR Uu interface that, if the quantity of TDD patterns in the uplink-downlink TDD configuration is 2, and periodicities of the two TDD patterns are P ms and $P_2$ ms respectively, $P+P_2$ should be able to be exactly divided by 20 ms, that is, 20 ms/(P+$P_2$) is an integer. In this condition, when the two optional periodicities 3 ms and 4 ms are considered, there are 16 combinations of two periodicities; or when the two optional periodicities 3 ms and 4 ms are not considered, there are 10 combinations of two periodicities. Specifically, one periodicity may be indicated by using tables shown in Table 3 and Table 4.

In Table 3, the two optional periodicities 3 ms and 4 ms are considered, a first periodicity and a second periodicity respectively correspond to the periodicity of pattern1 and the periodicity of pattern2 in the uplink-downlink TDD configuration, and the first periodicity and the second periodicity correspond to the value range {0.5 ms, 0.625 ms, 1 ms, 1.25 ms, 2 ms, 2.5 ms, 3 ms, 4 ms, 5 ms, 1 ms}. Therefore, there are 16 periodicity combinations, and one number (namely, the foregoing index) is indicated by using X−1 bits, that is, one periodicity combination is indicated. Details are as follows:

TABLE 3

| Number | Total periodicity P + $P_2$ (ms) | First periodicity P (ms) | Second periodicity $P_2$ (ms) |
|---|---|---|---|
| 0 | 1 | 0.5 | 0.5 |
| 1 | 1.25 | 0.625 | 0.625 |
| 2 | 2 | 1 | 1 |
| 3 | 2.5 | 0.5 | 2 |
| 4 | 2.5 | 1.25 | 1.25 |
| 5 | 2.5 | 2 | 0.5 |
| 6 | 4 | 1 | 3 |
| 7 | 4 | 2 | 2 |
| 8 | 4 | 3 | 1 |
| 9 | 5 | 1 | 4 |
| 10 | 5 | 2 | 3 |
| 11 | 5 | 2.5 | 2.5 |
| 12 | 5 | 3 | 2 |
| 13 | 5 | 4 | 1 |
| 14 | 10 | 5 | 5 |
| 15 | 20 | 10 | 10 |

In Table 4, the two optional periodicities 3 ms and 4 ms are not considered, a first periodicity and a second periodicity respectively correspond to the periodicity of pattern1 and the periodicity of pattern2 in the uplink-downlink TDD configuration, and the first periodicity and the second periodicity correspond to the value range {0.5 ms, 0.625 ms, 1 ms, 1.25 ms, 2 ms, 2.5 ms, 5 ms, 10 ms}. Therefore, there are 10 periodicity combinations, and one number (namely, the foregoing index) is indicated by using X−1 bits, that is, one periodicity combination is indicated. Details are as follows:

TABLE 4

| Number | Total periodicity P + $P_2$ (ms) | First periodicity P (ms) | Second periodicity $P_2$ (ms) |
|---|---|---|---|
| 0 | 1 | 0.5 | 0.5 |
| 1 | 1.25 | 0.625 | 0.625 |
| 2 | 2 | 1 | 1 |
| 3 | 2.5 | 0.5 | 2 |
| 4 | 2.5 | 1.25 | 1.25 |
| 5 | 2.5 | 2 | 0.5 |
| 6 | 4 | 2 | 2 |
| 7 | 5 | 2.5 | 2.5 |
| 8 | 10 | 5 | 5 |
| 9 | 20 | 10 | 10 |
| 10 to 15 | Reserved | | |

It should be noted that correspondences between the numbers and the periodicity combinations in Table 3 and Table 4 are not limited. In addition, an actually used periodicity combination may be one row or several rows shown in the tables, all rows in the tables, or more rows than the rows shown in the tables. Optionally, a value of X is 5.

Second Implementation

The first bit sequence is used to indicate the TDD pattern periodicity, where the TDD pattern periodicity is related to the quantity of TDD patterns. For example, based on indication content of an information element TDD-UL-DL-ConfigCommon in the 3GPP 38.331V15.7.0 standard, if the uplink-downlink TDD configuration includes only pattern1, it indicates that the quantity of TDD patterns is 1, and the TDD pattern periodicity includes only the periodicity of pattern1; or if the uplink-downlink TDD configuration includes pattern1 and pattern2, it indicates that the quantity of TDD patterns is 2, and the TDD pattern periodicity includes the periodicity of pattern1 and the periodicity of pattern2.

During specific implementation, a periodicity index table may be configured in the first terminal device and the second terminal device, and a value is assigned to the first bit sequence based on an index corresponding to the TDD pattern periodicity, to indicate the TDD pattern periodicity.

For ease of understanding, a periodicity included in the information element TDD-UL-DL-Pattern in the 3GPP 38.331V15.7.0 standard is used as an example below for description:

For example, the foregoing X-bit bit sequence in the PSBCH payload may be used to indicate one or two periodicities in the uplink-downlink TDD configuration. When the quantity of TDD patterns is 1, the X bits indicate one periodicity in the uplink-downlink TDD configuration, namely, the periodicity of pattern1; or when the quantity of TDD patterns is 2, the X bits indicate two periodicities in the uplink-downlink TDD configuration, namely, the periodicity of pattern1 and the periodicity of pattern2.

For example, the X bits may be used to indicate one or two periodicities in a periodicity range {0.5 ms, 0.625 ms, 1 ms, 1.25 ms, 2 ms, 2.5 ms, 3 ms, 4 ms, 5 ms, 10 ms}. Alternatively, when two optional periodicities 3 ms and 4 ms are not considered, the X bits may be used to indicate one or two periodicities in a periodicity range {0.5 ms, 0.625 ms, 1 ms, 1.25 ms, 2 ms, 2.5 ms, 5 ms, 10 ms}.

For example, the two optional periodicities 3 ms and 4 ms are considered in Table 5. When the quantity of TDD patterns is 1, a total periodicity in the table represents the periodicity of pattern1, a first periodicity represents the periodicity of pattern1, and a second periodicity is marked as "N/A", which is used to indicate that the periodicity of pattern2 does not exist in this condition. When the quantity of TDD patterns is 2, the total periodicity in the table represents a sum of the periodicity of pattern1 and the periodicity of pattern2, the first periodicity represents the periodicity of pattern1, and the second periodicity represents the periodicity of pattern2. The first periodicity and the second periodicity correspond to the value range {0.5 ms, 0.625 ms, 1 ms, 1.25 ms, 2 ms, 2.5 ms, 3 ms, 4 ms, 5 ns, 10 ms}. Considering a case in which the quantity of TDD patterns is 1 and a case in which the quantity of TDD patterns is 2, there are 26 periodicity combinations in total. One number (namely, the foregoing index) is indicated by using X bits, that is, one periodicity combination is indicated. Details are as follows:

TABLE 5

| Number | Total periodicity P or P + $P_2$ (ms) | First periodicity P (ms) | Second periodicity $P_2$ (ms) |
| --- | --- | --- | --- |
| 0 | 0.5 | 0.5 | N/A |
| 1 | 0.625 | 0.625 | N/A |
| 2 | 1 | 1 | N/A |
| 3 | 1.25 | 1.25 | N/A |
| 4 | 2 | 2 | N/A |
| 5 | 2.5 | 2.5 | N/A |
| 6 | 3 | 3 | N/A |
| 7 | 4 | 4 | N/A |
| 8 | 5 | 5 | N/A |
| 9 | 10 | 10 | N/A |
| 10 | 1 | 0.5 | 0.5 |
| 11 | 1.25 | 0.625 | 0.625 |
| 12 | 2 | 1 | 1 |
| 13 | 2.5 | 0.5 | 2 |
| 14 | 2.5 | 1.25 | 1.25 |
| 15 | 2.5 | 2 | 0.5 |
| 16 | 4 | 1 | 3 |
| 17 | 4 | 2 | 2 |
| 18 | 4 | 3 | 1 |
| 19 | 5 | 1 | 4 |
| 20 | 5 | 2 | 3 |
| 21 | 5 | 2.5 | 2.5 |
| 22 | 5 | 3 | 2 |
| 23 | 5 | 4 | 1 |
| 24 | 10 | 5 | 5 |
| 25 | 20 | 10 | 10 |
| 26 to 31 | Reserved | | |

For another example, the two optional periodicities 3 ms and 4 ms are not considered in Table 6. When the quantity of TDD patterns is 1, a total periodicity in the table represents the periodicity of pattern1, a first periodicity represents the periodicity of pattern1, and a second periodicity may be marked as "N/A", which is used to indicate that the periodicity of pattern2 does not exist in this condition. When the quantity of TDD patterns is 2, the total periodicity in the table represents a sum of the periodicity of pattern1 and the periodicity of pattern2, the first periodicity represents the periodicity of pattern1, and the second periodicity represents the periodicity of pattern2. The first periodicity and the second periodicity correspond to the value range {0.5 ms, 0.625 ms, 1 ms, 1.25 ms, 2 ms, 2.5 ms, 5 ms, 10 ms}. Considering a case in which the quantity of TDD patterns is 1 and a case in which the quantity of TDD patterns is 2, there are 18 periodicity combinations in total. One number (namely, the foregoing index) is indicated by using X bits, that is, one periodicity combination is indicated. Details are as follows:

TABLE 6

| Number | Total periodicity P or P + $P_2$ (ms) | First periodicity P (ms) | Second periodicity $P_2$ (ms) |
| --- | --- | --- | --- |
| 0 | 0.5 | 0.5 | N/A |
| 1 | 0.625 | 0.625 | N/A |
| 2 | 1 | 1 | N/A |
| 3 | 1.25 | 1.25 | N/A |
| 4 | 2 | 2 | N/A |
| 5 | 2.5 | 2.5 | N/A |
| 6 | 5 | 5 | N/A |
| 7 | 10 | 10 | N/A |
| 8 | 1 | 0.5 | 0.5 |
| 9 | 1.25 | 0.625 | 0.625 |
| 10 | 2 | 1 | 1 |
| 11 | 2.5 | 0.5 | 2 |
| 12 | 2.5 | 1.25 | 1.25 |
| 13 | 2.5 | 2 | 0.5 |
| 14 | 4 | 2 | 2 |
| 15 | 5 | 2.5 | 2.5 |
| 16 | 10 | 5 | 5 |
| 17 | 20 | 10 | 10 |
| 18 to 31 | Reserved | | |

It should be noted that correspondences between the numbers and the periodicity combinations in Table 5 and Table 6 are not limited. In addition, an actually used periodicity combination may be one row or several rows shown in the tables, all rows in the tables, or more rows than the rows shown in the tables. Optionally, a value of X is 5.

In an optional implementation, the foregoing indication information includes a second bit sequence, and the second bit sequence corresponds to the foregoing UL transmission duration. For a specific indication manner, refer to the following four implementations.

First Implementation

When the quantity of TDD patterns included in the uplink-downlink TDD configuration is 1, the second bit sequence is used to indicate UL transmission duration in a periodicity of the TDD pattern.

Optionally, the second bit sequence is a binary representation of a quantity corresponding to the UL transmission duration.

Figure 8:
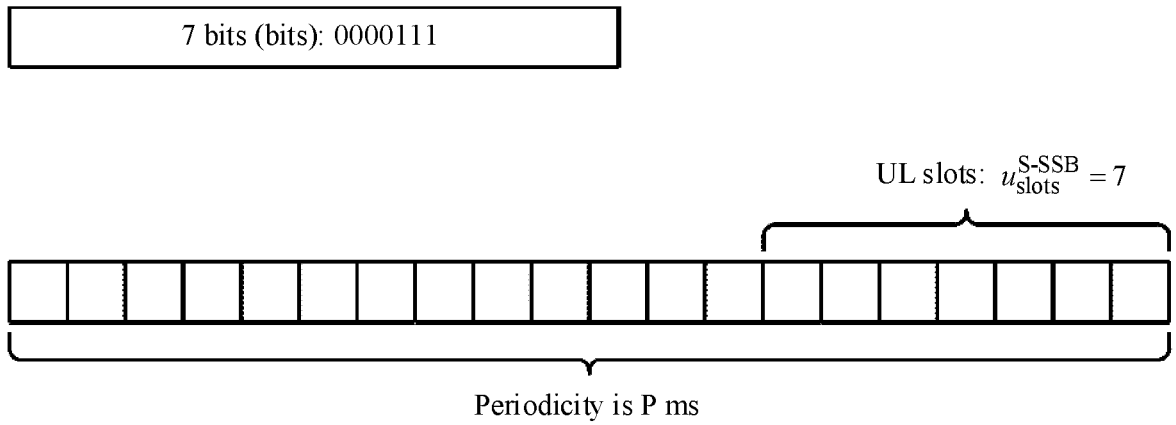
FIG. 8 is a schematic diagram of a first UL transmission duration indication according to an embodiment of this application.

For ease of understanding, for example, the UL transmission duration includes the quantity of UL slots, and the second bit sequence is the foregoing Y-bit bit sequence in the PSBCH payload, and is specifically a binary representation of the quantity $u_{slots}^{S-SSB}$ of UL slots. FIG. 8 is a schematic diagram of a first UL transmission duration indication according to an embodiment of this application. FIG. 8 shows that Y=7 bits are used in the PSBCH payload to indicate $u_{slots}^{S-SSB}$, the periodicity P is 10 ms, and the quantity of UL slots that needs to be indicated in the periodicity is $u_{slots}^{S-SSB}$=7. In this case, the Y=7 bits in the PSBCH payload may be a binary form of the value 7, which is expressed as 0000111.

Optionally, some bits in the second bit sequence are the binary representation of the quantity corresponding to the UL transmission duration.

For ease of understanding, for example, the UL transmission duration includes the quantity of UL slots, the second bit sequence is the foregoing Y-bit bit sequence in the PSBCH payload, and Y−1 bits in the second bit sequence are the binary representation of the quantity $u_{slots}^{S-SSB}$ of UL slots. For example, Y=7 bits are used in the PSBCH payload to indicate $u_{slots}^{S-SSB}$, the periodicity P is 10 ms, and the quantity of UL slots that needs to be indicated in the periodicity is $u_{slots}^{S-SSB}$=7. In this case, the Y−1=6 bits in the PSBCH payload may be a binary form of the value 7, which is expressed as 000111.

Second Implementation

When the quantity of TDD patterns included in the uplink-downlink TDD configuration is N, the second bit sequence is used to indicate UL transmission duration in the periodicity of each of the N TDD patterns, where N is an integer greater than 1.

For ease of understanding, for example, N is 2, the UL transmission duration includes the quantity of UL slots, and the second bit sequence is the foregoing Y-bit bit sequence in the PSBCH payload. The second bit sequence may be used to indicate two quantities of UL slots that correspond to two TDD patterns included in the uplink-downlink TDD configuration, where the two quantities are respectively represented as $u_{slots}^{S-SSB}$ and $u_{slots,2}^{S-SSB}$.

Optionally, $y_1$ bits in the Y bits are used to indicate a quantity of UL slots that corresponds to one TDD pattern included in the uplink-downlink TDD configuration, and $y_2$ bits are used to indicate a quantity of UL slots that corresponds to the other TDD pattern included in the uplink-downlink TDD configuration. For example, $y_1$ bits are a binary representation of $u_{slots}^{S-SSB}$, $y_2$ bits are a binary representation of $u_{slots,2}^{S-SSB}$, where $y_1$ is an integer greater than or equal to 0 and less than or equal to Y, $y_2$ is an integer greater than or equal to 0 and less than or equal to Y, and $Y=y_1+y_2$. Further, optionally, a manner in which $y_1$ bits or $y_2$ bits are used to indicate a quantity of UL slots that corresponds to a single TDD pattern may be the same as a manner in which Y bits are used to indicate a quantity of UL slots that corresponds to a single TDD pattern when the quantity of TDD patterns in the uplink-downlink TDD configuration is 1. Details are not described herein again.

Figure 9:
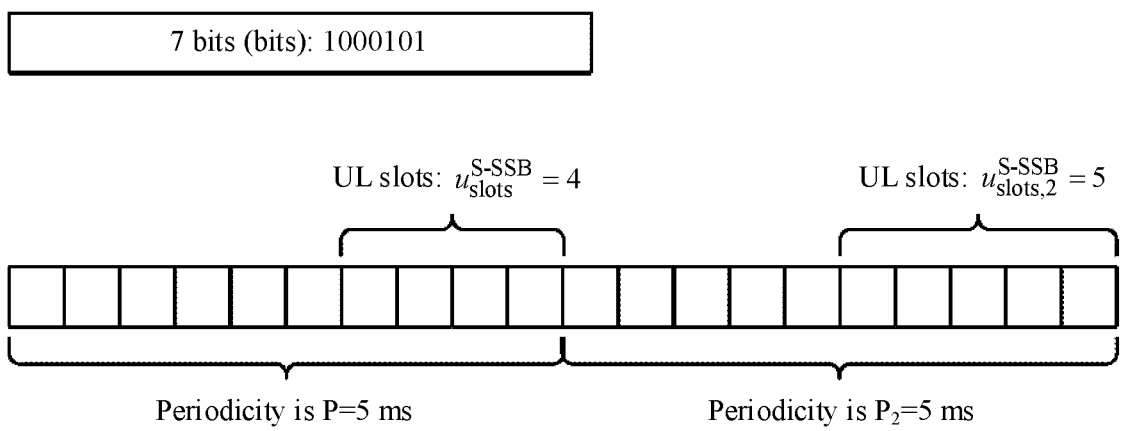
FIG. 9 is a schematic diagram of a second UL transmission duration indication according to an embodiment of this application.

For example, Y is 7, $y_1$ is 3, and $y_2$ is 4. FIG. 9 is a schematic diagram of a second UL transmission duration indication according to an embodiment of this application. FIG. 9 shows that 3 bits and 4 bits are used to respectively indicate the two quantities $u_{slots}^{S-SSB}$ and $u_{slots,2}^{S-SSB}$ of UL slots that correspond to the two TDD patterns in the uplink-downlink TDD configuration, periodicities of the two TDD patterns in the uplink-downlink TDD configuration are respectively P=5 ms and $P_2$=5 ms, and the two quantities of UL slots that need to be indicated in the PSBCH payload are respectively $u_{slots}^{S-SSB}$=4 and $u_{slots,2}^{S-SSB}$=5. In this case, in 7 bits in the PSBCH payload, 3 bits may be represented as 100, and 4 bits may be represented as 0101. Correspondingly, the 7 bits in the PSBCH payload may be represented as 1000101.

Third Implementation

When the quantity of TDD patterns included in the uplink-downlink TDD configuration is N, the second bit sequence is used to indicate UL transmission duration in a periodicity of a specified TDD pattern in the N TDD patterns, where N is an integer greater than 1.

For ease of understanding, for example, N is 2, the UL transmission duration includes the quantity of UL slots, and the second bit sequence is the foregoing Y-bit bit sequence in the PSBCH payload. The second bit sequence may be used to indicate a quantity $u_{slots}^{S-SSB}$ of UL slots that corresponds to the 1$^{st}$ TDD pattern in the two TDD patterns included in the uplink-downlink TDD configuration or a quantity $u_{slots,2}^{S-SSB}$ of UL slots that corresponds to the 2$^{nd}$ TDD pattern. That is, for example, Y bits are a binary representation of $u_{slots}^{S-SSB}$ or $u_{slots,2}^{S-SSB}$. Further, optionally, a manner in which Y bits are used to indicate a quantity of UL slots that corresponds to a TDD pattern may be the same as a manner in which Y bits are used to indicate a quantity of UL slots that corresponds to a single TDD pattern when the quantity of TDD patterns in the uplink-downlink TDD configuration is 1. Details are not described herein again.

Figure 10:
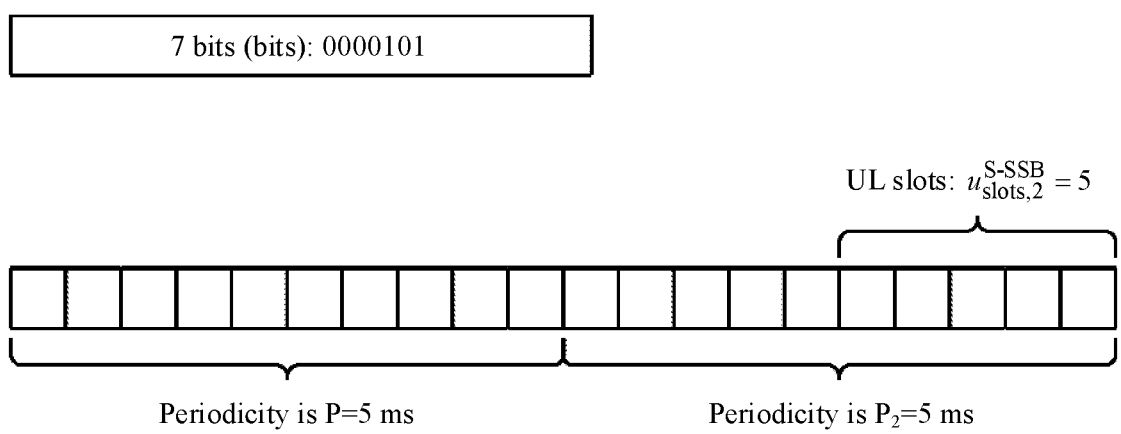
FIG. 10 is a schematic diagram of a third UL transmission duration indication according to an embodiment of this application.

For example, Y is 7, and the Y bits are used to indicate the quantity $u_{slots,2}^{S-SSB}$ of UL slots that corresponds to the 2$^{nd}$ TDD pattern in the uplink-downlink TDD configuration. FIG. 10 is a schematic diagram of a third UL transmission duration indication according to an embodiment of this application. Periodicities of two TDD patterns in the uplink-downlink TDD configuration are respectively P=5 ms and $P_2$=5 ms. FIG. 10 specifically shows that 7 bits are used to indicate the quantity $u_{slots,2}^{S-SSB}$ of UL slots that corresponds to the 2$^{nd}$ TDD pattern, and the quantity $u_{slots,2}^{S-SSB}$ of UL slots that needs to be indicated in the PSBCH payload and that corresponds to the 2$^{nd}$ TDD pattern is 5. In this case, 7 bits in the PSBCH payload may be represented as 0000101.

Fourth Implementation

When the quantity of TDD patterns included in the uplink-downlink TDD configuration is N, a first part of bits in the second bit sequence are used to indicate a first TDD pattern in the N TDD patterns, and a second part of bits in the second bit sequence are used to indicate UL transmission duration in a periodicity of the first TDD pattern, where N is an integer greater than 1.

The first TDD pattern may be any one of the N TDD patterns. Optionally, the first TDD pattern is a TDD pattern with maximum UL transmission duration in corresponding periodicities of the N TDD patterns, that is, the UL transmission duration in the periodicity of the first TDD pattern is greater than UL transmission duration in a periodicity of a second TDD pattern, and the second TDD pattern is any one of the N TDD patterns except the first TDD pattern.

For ease of understanding, for example, N is 2, the UL transmission duration includes the quantity of UL slots, and the second bit sequence is the foregoing Y-bit bit sequence in the PSBCH payload. 1 bit in the second bit sequence may be used to indicate the first TDD pattern in the two TDD patterns included in the uplink-downlink TDD configuration, the first TDD pattern may be the $1^{st}$ TDD pattern or the $2^{nd}$ TDD pattern in the two TDD patterns, and Y−1 bits in the second bit sequence are used to indicate the quantity of UL slots that corresponds to the first TDD pattern.

Specifically, if a value of the 1 bit may be set to 0, the first TDD pattern indicated by the 1 bit is the $1^{st}$ TDD pattern; or if a value of the 1 bit is 1, the first TDD pattern indicated by the 1 bit is the $2^{nd}$ TDD pattern. Further, optionally, a manner in which Y−1 bits are used to indicate a quantity of UL slots that corresponds to a TDD pattern may be the same as a manner in which Y bits are used to indicate a quantity of UL slots that corresponds to a single TDD pattern when the quantity of TDD patterns in the uplink-downlink TDD configuration is 1. For example, Y−1 bits are a binary representation of the quantity of UL slots that corresponds to the first TDD pattern. Details are not described herein again.

Figure 11:
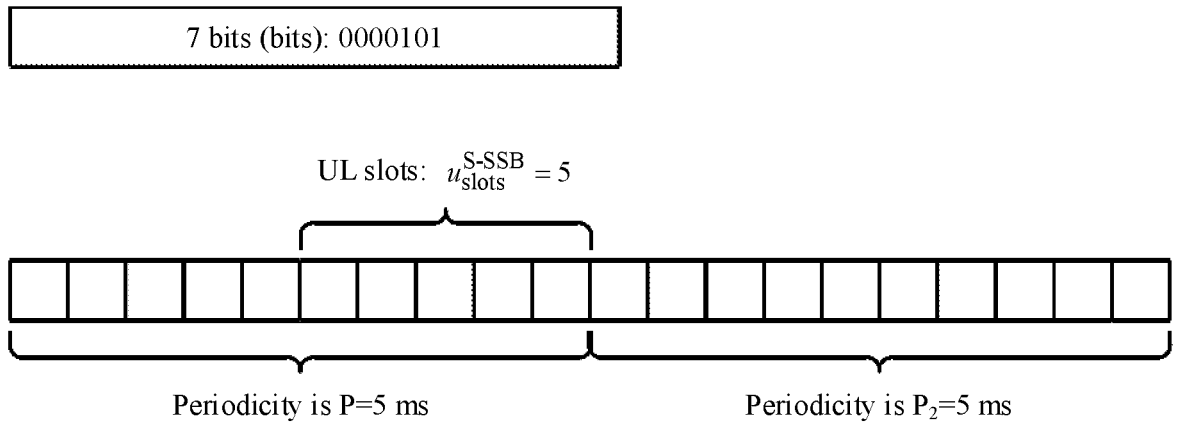
FIG. 11 is a schematic diagram of a fourth UL transmission duration indication according to an embodiment of this application.

For example, Y is 7, the PSBCH payload is used to indicate the quantity of UL slots that corresponds to the $1^{st}$ TDD pattern in the two TDD patterns in the uplink-downlink TDD configuration, and a value of 1 bit in the Y bits is 0. FIG. 11 is a schematic diagram of a fourth UL transmission duration indication according to an embodiment of this application. FIG. 11 shows that periodicities of two TDD patterns in the uplink-downlink TDD configuration are respectively P=5 ms and $P_2$=5 ms, remaining 6 bits in the 7 bits are used to indicate the quantity $u_{slots}^{S-SSB}$ of UL slots that corresponds to the $1^{st}$ TDD pattern in the two TDD patterns in the uplink-downlink TDD configuration, and the quantity $u_{slots}^{S-SSB}$ of UL slots that needs to be indicated in the PSBCH payload is 5. In this case, 7 bits in the PSBCH payload may be represented as 0000101.

Figure 12:
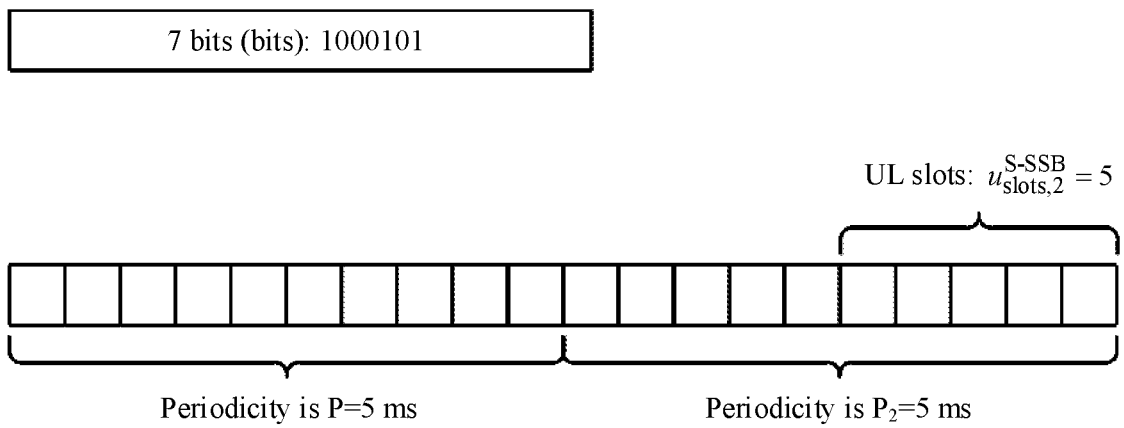
FIG. 12 is a schematic diagram of a fifth UL transmission duration indication according to an embodiment of this application.

For example, Y is 7, the PSBCH payload is used to indicate the quantity of UL slots that corresponds to the $2^{nd}$ TDD pattern in the two TDD patterns in the uplink-downlink TDD configuration, and a value of 1 bit in the Y bits is 1. FIG. 12 is a schematic diagram of a fifth UL transmission duration indication according to an embodiment of this application. FIG. 12 shows that periodicities of two TDD patterns in the uplink-downlink TDD configuration are respectively P=5 ms and $P_2$=5 ms, remaining 6 bits in the 7 bits are used to indicate the quantity $u_{slots}^{S-SSB}$ of UL slots that corresponds to the $2^{nd}$ TDD pattern in the two TDD patterns in the uplink-downlink TDD configuration, and the quantity $u_{slots}^{S-SSB}$ of UL slots that needs to be indicated in the PSBCH payload is 5. In this case, 7 bits in the PSBCH payload may be represented as 1000101.

Further, the UL transmission duration indicated by the indication information may be reference UL transmission duration included in the uplink-downlink TDD configuration, or may be determined by adjusting the reference UL transmission duration based on an actual communication parameter. The reference UL transmission duration includes the quantity of UL slots and/or the quantity of UL symbols in the uplink-downlink TDD configuration.

The communication parameter used to determine the UL transmission duration includes a subcarrier spacing SCS of the S-SSB used to carry the indication information and/or a quantity of bits that are in the indication information and that are used to indicate the UL transmission duration. Specifically, the UL transmission duration indicated by the indication information may be determined with reference to the following optional implementations.

In an optional implementation, first UL transmission duration may be determined based on a ratio of the subcarrier spacing SCS of the S-SSB to a reference SCS included in the uplink-downlink TDD configuration, where the first UL transmission duration is the UL transmission duration in the periodicity of any one of the one or N TDD patterns.

Optionally, the subcarrier spacing SCS of the S-SSB is an SCS configured on an SL bandwidth part (BWP).

For ease of implementation, in this embodiment of this application, an example in which the first UL transmission duration includes the quantity of UL slots is used to provide a manner of determining the first UL transmission duration, which is described as follows:

$$u_{slots}^{S-SSB} = \lfloor u^{slots} \cdot 2^{\mu_{ref}^{S-SSB}} / 2^{\mu_{ref}} \rfloor,$$

where $u_{slots}^{S-SSB}$ represents the quantity of UL slots included in the first UL transmission duration; $\lfloor \ \rfloor$ represents rounding down; $u_{slots}$ represents a quantity of reference UL slots included in the uplink-downlink TDD configuration, where a periodicity to which the quantity of reference UL slots belongs is consistent with a periodicity to which the quantity of UL slots included in the foregoing first UL transmission duration belongs; $15\ kHz \cdot 2^{\mu_{ref}^{S-SSB}}$ represents the SCS of the S-SSB; $15\ kHz \cdot 2^{\mu_{ref}}$ represents the reference SCS included in the uplink-downlink TDD configuration; and $2^{\mu_{ref}^{S-SSB}} / 2^{\mu_{ref}}$ represents the ratio of the SCS of the S-SSB to the reference SCS.

Figure 13:
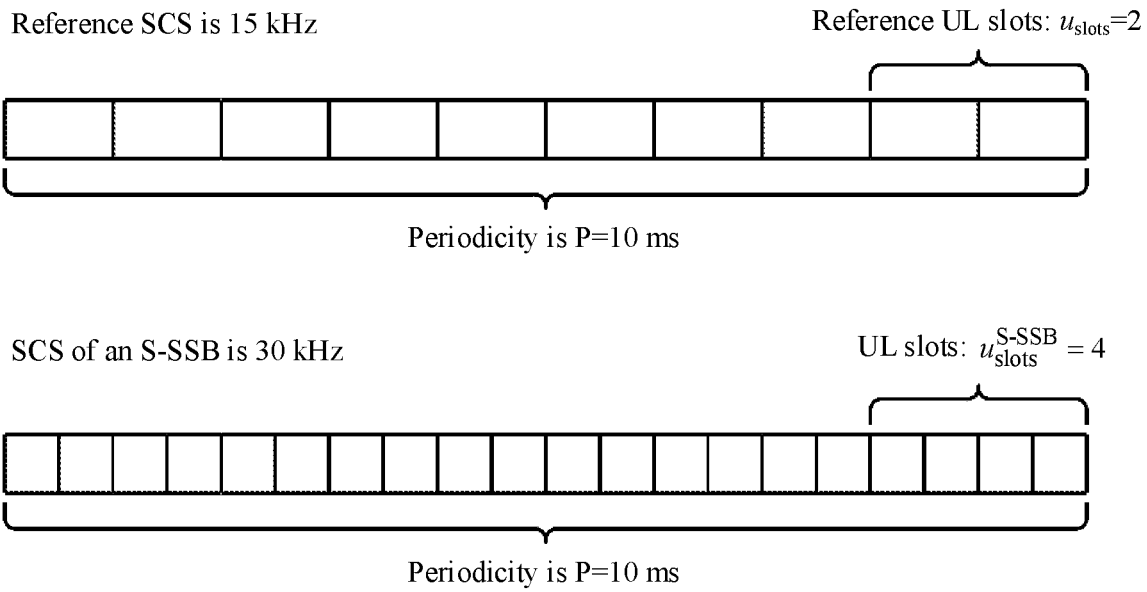
FIG. 13 is a schematic comparison diagram of quantities of UL slots according to an embodiment of this application.

For example, it is assumed that the reference SCS indicated in the RRC signaling is $15\ kHz \cdot 2^{\mu_{ref}} = 15\ kHz$, $u_{slots} = 2$, the periodicity P is 10 ms, and the SCS of the S-SSB is $15\ kHz \cdot 2^{\mu_{ref}^{S-SSB}} = 30\ kHz$. In this case, $u_{slots}^{S-SSB} = \lfloor 2 \cdot 2 \rfloor = 4$. Based on the foregoing parameter settings, FIG. 13 is a schematic comparison diagram of quantities of UL slots according to an embodiment of this application, and specifically shows a correspondence between the quantity of reference UL slots in the uplink-downlink TDD configuration and the quantity of UL slots that is indicated in the indication information on the PSBCH.

Figure 14:
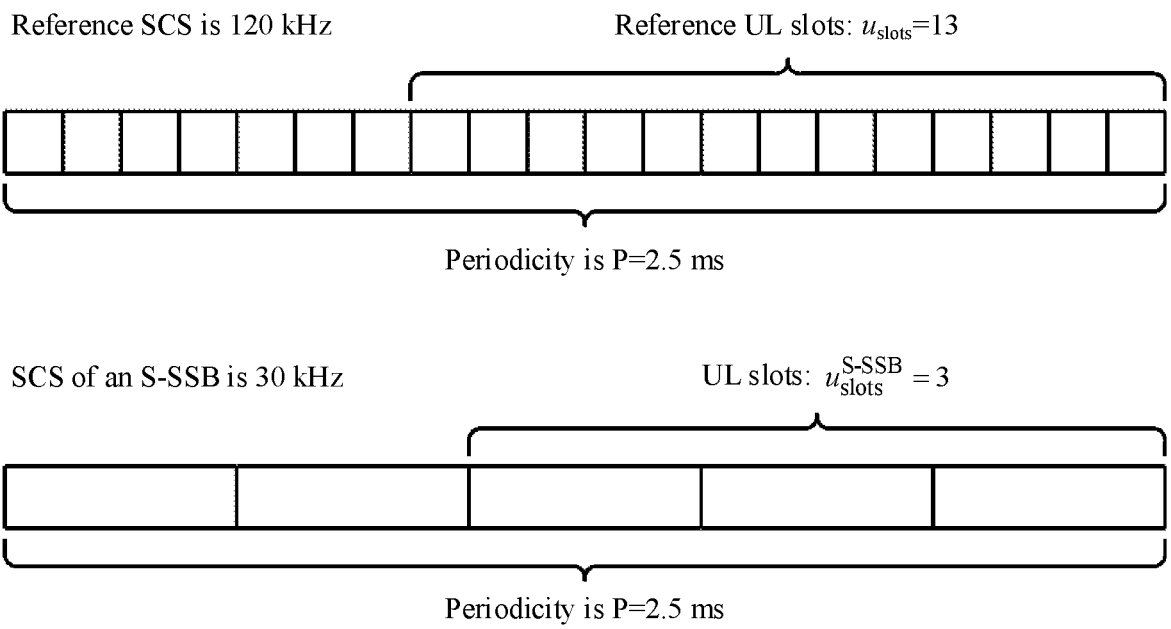
FIG. 14 is another schematic comparison diagram of quantities of UL slots according to an embodiment of this application.

For example, it is assumed that the reference SCS in the RRC signaling is $15\ kHz \cdot 2^{\mu_{ref}} = 120\ kHz$, $\mu_{slots} = 13$, the periodicity P is 2.5 ms, and the SCS of the S-SSB is $15\ kHz \cdot 2^{\mu_{ref}^{S-SSB}} = 30\ kHz$. In this case, $u_{slots}^{S-SSB} = \lfloor 13 \cdot \frac{1}{4} \rfloor = 3$. Based on the foregoing parameter settings, FIG. 14 is another schematic comparison diagram of quantities of UL slots according to an embodiment of this application, and specifically shows a correspondence between the quantity of reference UL slots in the uplink-downlink TDD configuration and the quantity of UL slots that is indicated in the indication information on the PSBCH.

In another optional implementation, a subcarrier spacing SCS of the S-SSB may be compared with an SCS threshold, to determine first UL transmission duration based on a result of the comparison. The SCS threshold is related to a quantity of bits used to indicate the first UL transmission duration, and the first UL transmission duration is the UL transmission duration in the periodicity of any one of the one or N TDD patterns.

During specific implementation, the SCS threshold may be determined in the following manner:

For example, the quantity of TDD patterns included in the uplink-downlink TDD configuration is 1, and $Y_2$ bits in the PSBCH payload are used to indicate the first UL transmission duration. The SCS threshold may be determined based on a value of a function $15\ kHz \cdot 2^{Y_2}/10$ related to the $Y_2$ bits, where "10" is a maximum value of a periodicity of a single TDD pattern, and $Y_2$ is a positive integer less than or equal to Y.

For example, if $Y_2$ is 7, 15 kHz·$2^{Y_2}/10$=192 kHz. The SCS of the S-SSB is represented as 15 kHz·$2^{\mu_{ref}^{S-SSB}}$, a value of $\mu_{ref}^{S-SSB}$ may be an integer such as 0, 1, 2, or 3, and a value of the SCS of the S-SSB may be 15 kHz, 30 kHz, 60 kHz, 120 kHz, 240 kHz, or the like. Therefore, when $Y_2$ is 7, the SCS threshold may be determined as 15 kHz·$2^{\lfloor log_2(2^{Y_2}/10)\rfloor}$ based on 192 kHz, namely, 120 kHz. In this case, that the SCS of the S-SSB is less than or equal to the SCS threshold is equivalent to that the SCS of the S-SSB is less than the function 15 kHz·$2^{Y_2}/10$ related to the $Y_2$ bits.

For example, if $Y_2$ is 6, 15 kHz·$2^{Y_2}/10$=96 kHz. The SCS of the S-SSB is represented as 15 kHz·$2^{\mu_{ref}^{S-SSB}}$, a value of $\mu_{ref}^{S-SSB}$ may be an integer such as 0, 1, 2, or 3, and a value of the SCS of the S-SSB may be 15 kHz, 30 kHz, 60 kHz, 120 kHz, 240 kHz, or the like. Therefore, when $Y_2$ is 6, the SCS threshold may be determined as 15 kHz·$2^{\lfloor log_2(2^{Y_2}/10)\rfloor}$ based on 96 kHz, namely, 60 kHz. In this case, that the SCS of the S-SSB is less than or equal to the SCS threshold is equivalent to that the SCS of the S-SSB is less than the function 15 kHz·$2^{Y_2}/10$ related to the $Y_2$ bits.

Further, the determining the first UL transmission duration based on a result of the comparison may be specifically implemented in any one of the following implementations.

First Implementation (1) When the SCS of the S-SSB is less than or equal to the SCS threshold, the first UL transmission duration is determined based on a ratio of the SCS of the S-SSB to the reference SCS included in the uplink-downlink TDD configuration.

For ease of implementation, in this embodiment of this application, an example in which the first UL transmission duration includes the quantity of UL slots is used to provide a manner of determining the first UL transmission duration, which is described as follows:

$$u_{slots}^{S-SSB}=\lfloor u_{slots}\cdot 2^{\mu_{ref}^{S-SSB}}/2^{\mu_{ref}}\rfloor,$$

where $u_{slots}^{S-SSB}$ represents the quantity of UL slots included in the first UL transmission duration; $\lfloor\ \rfloor$ represents rounding down; $u_{slots}$ represents a quantity of reference UL slots included in the uplink-downlink TDD configuration, where a periodicity to which the quantity of reference UL slots belongs is consistent with a periodicity to which the quantity of UL slots included in the foregoing first UL transmission duration belongs; 15 kHz·$2^{\mu_{ref}^{S-SSB}}$ represents the SCS of the S-SSB; 15 kHz·$2^{\mu_{ref}}$ represents the reference SCS included in the uplink-downlink TDD configuration; and $2^{\mu_{ref}^{S-SSB}}/2^{\mu_{ref}}$ represents the ratio of the SCS of the S-SSB to the reference SCS.

For example, $Y_2$ bits in the PSBCH payload are used to indicate the quantity of UL slots, and $Y_2$ is 7. In this case, 15 kHz·$2^{Y_2}/10$=192 kHz, and the SCS threshold is 120 kHz. It is assumed that the reference SCS indicated in the RRC signaling is 15 kHz·$2^{\mu_{ref}}$=15 kHz, $\mu_{slots}$=2, the periodicity P is 10 ms, and the SCS of the S-SSB is 15 kHz·$2^{\mu_{ref}^{S-SSB}}$=30 kHz, meeting a condition of being less than or equal to the SCS threshold. In this case, the first UL transmission duration is determined as $u_{slots}^{S-SSB}=\lfloor 2\cdot 2\rfloor$=4 based on the ratio of the SCS of the S-SSB to the reference SCS included in the uplink-downlink TDD configuration.

For example, $Y_2$ bits in the PSBCH payload are used to indicate the quantity of UL slots, and $Y_2$ is 6. In this case, 15 kHz·$2^{Y_2}/10$=96 kHz, and the SCS threshold is 60 kHz. It is assumed that the reference SCS indicated in the RRC signaling is 15 kHz·$2^{\mu_{ref}}$=15 kHz, $u_{slots}$=2, the periodicity P is 10 ms, and the SCS of the S-SSB is 15 kHz·$2^{\mu_{ref}^{S-SSB}}$=30 kHz, meeting a condition of being less than or equal to the SCS threshold. In this case, the first UL transmission duration is determined as $u_{slots}^{S-SSB}=\lfloor 2\cdot 2\rfloor$=4 based on the ratio of the SCS of the S-SSB to the reference SCS included in the uplink-downlink TDD configuration.

(2) When the SCS of the S-SSB is greater than the SCS threshold, the first UL transmission duration is determined based on a ratio of the SCS threshold to the reference SCS included in the uplink-downlink TDD configuration information.

For ease of implementation, in this embodiment of this application, for example, the first UL transmission duration includes the quantity of UL slots, and $Y_2$ bits in the PSBCH payload are used to indicate the quantity of UL slots. That the SCS of the S-SSB is greater than the SCS threshold is equivalent to indicating that the SCS 15 kHz·$2^{\mu_{ref}^{S-SSB}}$ of the S-SSB is greater than 15 kHz·$2^{Y_2}/10$. In this condition, the quantity of UL slots may be determined based on the ratio of the SCS threshold to the reference SCS, namely, $2^{\lfloor log_2(2^{Y_2}/10)\rfloor}/2^{\mu_{ref}}$. Specifically, refer to the foregoing manner of determining the quantity of UL slots based on the ratio of the SCS of the S-SSB to the reference SCS. Details are not described herein again.

For example, if $Y_2$ is 7, 15 kHz·$2^{Y_2}/10$=192 kHz. If the SCS 15 kHz·$2^{\mu_{ref}^{S-SSB}}$ of the S-SSB is greater than 120 kHz, the quantity of UL slots, $u_{slots}^{S-SSB}$, may be obtained based on the SCS threshold 120 kHz.

For example, if $Y_2$ is 6, 15 kHz·$2^{Y_2}/10$=96 kHz. If the SCS 15·kHz·$2^{\mu_{ref}^{S-SSB}}$ of the S-SSB is greater than 60 kHz, the quantity of UL slots, $u_{slots}^{S-SSB}$, may be obtained based on the SCS threshold 60 kHz.

Second Implementation

When the SCS of the S-SSB is greater than the SCS threshold, second UL transmission duration is determined based on a ratio of the SCS of the S-SSB to the reference SCS included in the uplink-downlink TDD configuration information. When the second UL transmission duration is greater than a time threshold, first UL transmission duration is determined based on the time threshold; or when the second UL transmission duration is less than or equal to a time threshold, first UL transmission duration is determined based on the second UL transmission duration. The time threshold is maximum UL transmission duration that can be indicated by a bit used to indicate the first UL transmission duration.

During specific implementation, for example, the first UL transmission duration includes the quantity of UL slots, and $Y_2$ bits in the PSBCH payload are used to indicate the quantity of UL slots. That the SCS of the S-SSB is greater than the SCS threshold is equivalent to indicating that the SCS 15 kHz·$2^{\mu_{res}^{S-SSB}}$ of the S-SSB is greater than 15 kHz·$2^{Y_2}/10$. In this condition, if the quantity $u_{slots}^{S-SSB}$ of UL slots is determined based on the SCS of the S-SSB, the $Y_2$ bits may not be enough for indicating the quantity $u_{slots}^{S-SSB}$ of UL slots. In this case, optionally, the quantity of UL slots that is indicated by the $Y_2$ bits in the PSBCH payload is $\min(u_{slots}^{S-SSB}, 2^{Y_2}-1)$, where $2^{Y_2}-1$ represents a maximum quantity of UL slots that can be indicated by the $Y_2$ bits.

For example, $Y_2$ is 7. In this case, 15 kHz·$2^{Y_2}/10$=192 kHz. The foregoing process may be further described as follows: If the SCS 15 kHz·$2^{\mu_{ref}^{S-SSB}}$ of the S-SSB is greater than 120 kHz, $u_{slots}^{S-SSB}$ may still be determined based on the SCS of the S-SSB. However, in this condition, if $u_{slots}^{S-SSB} > 2^7-1=127$, the quantity of UL slots that is indicated in the PSBCH payload is $\min(u_{slots}^{S-SSB}, 127)=127$; or if $u_{slots}^{S-SSB} \leq 2^7-1=127$, the quantity of UL slots that is indicated in the PSBCH payload is $\min(u_{slots}^{S-SSB}, 127)=u_{slots}^{S-SSB}$.

For example, $Y_2$ is 4. In this case, $15\ \text{kHz} \cdot 2^{Y_2}/10 = 24\ \text{kHz}$. The foregoing process may be further described as follows: If the SCS $15\ \text{kHz} \cdot 2^{\mu_{ref}^{S-SSB}}$ of the S-SSB is greater than 15 kHz, $u_{slots}^{S-SSB}$ may still be determined based on the SCS of the S-SSB. However, in this condition, if $u_{slots}^{S-SSB} > 2^4-1=15$, the quantity of UL slots that is indicated in the PSBCH payload is $\min(u_{slots}^{S-SSB}, 15)=15$; or if $u_{slots}^{S-SSB} \leq 2^4-1=15$, the quantity of UL slots that is indicated in the PSBCH payload is $\min(u_{slots}^{S-SSB}, 15)=u_{slots}^{S-SSB}$.

For example, $Y_2$ is 3. In this case, $15\ \text{kHz} \cdot 2^{Y_2}/10 = 12\ \text{kHz}$. The foregoing process may be further described as follows: If the SCS $15\ \text{kHz} \cdot 2^{\mu_{ref}^{S-SSB}}$ of the S-SSB is greater than or equal to 15 kHz, $u_{slots}^{S-SSB}$ may still be determined based on the SCS of the S-SSB. However, in this condition, if $u_{slots}^{S-SSB} > 2^3-1=7$, the quantity of UL slots that is indicated in the PSBCH payload is $\min(u_{slots}^{S-SSB}, 7)=7$; or if $u_{slots}^{S-SSB} \leq 2^3-1=7$, the quantity of UL slots that is indicated in the PSBCH payload is $\min(u_{slots}^{S-SSB}, 7)=u_{slots}^{S-SSB}$.

Third Implementation

When the SCS of the S-SSB is greater than the SCS threshold, second UL transmission duration is obtained based on a ratio of the SCS of the S-SSB to the reference SCS included in the uplink-downlink TDD configuration. The second UL transmission duration is scaled down based on a preset step. First UL transmission duration is determined based on scaled-down second UL transmission duration.

During specific implementation, for example, the first UL transmission duration includes the quantity of UL slots, and $Y_2$ bits in the PSBCH payload are used to indicate the quantity of UL slots. That the SCS of the S-SSB is greater than the SCS threshold is equivalent to indicating that the SCS $15\ \text{kHz} \cdot 2^{\mu_{ref}^{S-SSB}}$ of the S-SSB is greater than $15\ \text{kHz} \cdot 2^{Y_2}/10$. In this condition, if the quantity $u_{slots}^{S-SSB}$ of UL slots is determined based on the SCS of the S-SSB, the $Y_2$ bits may not be enough for indicating the quantity $u_{slots}^{S-SSB}$ of UL slots. In this case, optionally, the quantity of UL slots that is indicated by the $Y_2$ bits in the PSBCH payload is $\lfloor u_{slots}^{S-SSB}/Z \rfloor$, where $\lfloor\ \rfloor$ represents rounding down, Z represents the foregoing preset step, Z is a positive integer greater than or equal to 1, and Z is used to represent that a single UL slot indicated in the PSBCH payload actually represents Z UL slots. Z may be a value predefined in a standard, or may be a value determined based on the SCS of the S-SSB.

For example, $Y_2$ is 6. In this case, $15\ \text{kHz} \cdot 2^{Y_2}/10 = 96\ \text{kHz}$. The foregoing process may be further described as follows: If the SCS $15\ \text{kHz} \cdot 2^{\mu_{ref}^{S-SSB}}$ of the S-SSB is greater than 60 kHz, $u_{slots}^{S-SSB}$ may still be determined based on the SCS of the S-SSB. If Z=2 is predefined in the standard, it indicates that the single UL slot indicated in the PSBCH payload actually represents two UL slots. In this condition, the quantity of UL slots that is indicated in the PSBCH payload is $\lfloor u_{slots}^{S-SSB}/2 \rfloor$. For example, when $u_{slots}^{S-SSB}=75$, the quantity of UL slots that is indicated in the PSBCH payload is 37.

In the foregoing examples provided in embodiments of this application, W bits in the PSBCH payload are used to indicate the periodicity information and the quantity of UL slots. Specifically, X bits in the W bits are used to indicate the periodicity information, and Y bits in the W bits are used to indicate the quantity of UL slots. Optionally, W is 12, X is 5, and Y is 7, so that a quantity of bits required for indicating the uplink-downlink TDD configuration is simplified. The uplink-downlink TDD configuration of the Uu interface is reflected by using limited bits in the PSBCH payload. This avoids a problem that DL transmission on the Uu interface is interfered because the terminal device uses a DL slot when performing SL transmission. In addition, in comparison with a case in which the uplink-downlink TDD configuration is directly sent, signaling overheads between terminal devices are greatly reduced. For example, when the uplink-downlink TDD configuration includes one TDD pattern, minimum signaling overheads required in total for directly sending the uplink-downlink TDD configuration are 28 bits, where 3 bits indicate the reference SCS, 3 bits indicate the periodicity, 7 bits indicate a quantity of downlink slots, 4 bits indicate a quantity of downlink symbols, 7 bits indicate a quantity of uplink slots, and 4 bits indicate uplink symbols. When the uplink-downlink TDD configuration includes two TDD patterns, minimum signaling overheads required in total for directly sending the uplink-downlink TDD configuration are 53 bits, where 3 bits indicate the reference SCS, 6 bits indicate the periodicity, 14 bits indicate a quantity of downlink slots, 8 bits indicate a quantity of downlink symbols, 14 bits indicate a quantity of uplink slots, and 8 bits indicate a quantity of uplink symbols.

In addition, the foregoing indication method provided in embodiments of this application is not limited to being used in the PSBCH payload. When the transmit end UE needs to indicate a more refined uplink-downlink TDD configuration on the Uu interface to the receive end UE by using PC5 RRC signaling, a similar indication method may also be used in the PC5 RRC signaling.

Figure 15:
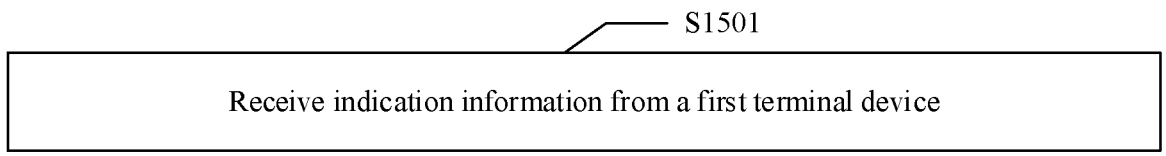
FIG. 15 is a schematic flowchart of another configuration information indication method according to an embodiment of this application.

Further, refer to FIG. 15. An embodiment of this application provides another configuration information indication method. The method is applied to a second terminal device, and includes the following step.

Step S1501: Receive indication information from a first terminal device, where the indication information is carried on a physical sidelink broadcast channel PSBCH of a sidelink synchronization signal block S-SSB, and the indication information is used to indicate periodicity information included in an uplink-downlink time division duplex TDD configuration received by the first terminal device.

In this embodiment of this application, the second terminal device receives the indication information from the first terminal device, where the indication information is related to the uplink-downlink TDD configuration received by the first terminal device. In this case, the second terminal device may perform SL transmission with another terminal device based on the indication information, to avoid interference caused by SL transmission between the terminal devices to DL transmission between a network device and the terminal device.

During specific implementation, the second terminal device may directly receive the indication information sent by the first terminal device, or may indirectly obtain, by using a forwarding mechanism of an intermediate device, the indication information sent by the first terminal device. In addition, the second terminal device may also serve as an intermediate device to forward the received indication information to the another terminal device.

In an optional implementation, the indication information is further used to indicate UL transmission duration in a TDD pattern periodicity. When determining the UL transmission duration by parsing the indication information, the second terminal device performs SL transmission within the UL transmission duration, to avoid interference caused because the SL transmission occupies DL transmission duration. The UL transmission duration includes a quantity of UL slots and/or a quantity of UL symbols.

In an optional implementation, the indication information may be specifically carried in a PSBCH payload of the sidelink synchronization signal block S-SSB. During specific implementation, some bits in the PSBCH payload may be used to carry the indication information. For example, W bits in the PSBCH payload are used to carry the indication information. X bits in the W bits are used to indicate the periodicity information, and Y bits in the W bits are used to indicate the UL transmission duration, where W is an integer greater than or equal to 0, X is an integer greater than or equal to 0 and less than or equal to W, and Y is an integer greater than or equal to 0 and less than or equal to W.

In an optional implementation, the periodicity information includes a quantity of TDD patterns and/or the TDD pattern periodicity, where the quantity of TDD patterns is one or more, and the TDD pattern periodicity includes a periodicity of each of the one or more TDD patterns.

The indication information includes a first bit sequence, and the first bit sequence corresponds to the periodicity information. Specifically, the following two implementations may be used for indication.

In an optional implementation, the first bit sequence is used to indicate the TDD pattern periodicity. In another optional implementation, a first part of bits in the first bit sequence are used to indicate the quantity of TDD patterns, and a second part of bits in the first bit sequence are used to indicate the TDD pattern periodicity. For a specific indication method, refer to the foregoing implementation performed on the first terminal device side. Details are not described herein again.

The indication information includes a second bit sequence, and the second bit sequence corresponds to the UL transmission duration. Specifically, any one of the following four implementations may be used for indication.

In a first implementation, when the quantity of TDD patterns included in the uplink-downlink TDD configuration is 1, the second bit sequence is used to indicate UL transmission duration in a periodicity of the TDD pattern.

In a second implementation, when the quantity of TDD patterns included in the uplink-downlink TDD configuration is N, the second bit sequence is used to indicate UL transmission duration in a periodicity of each of the N TDD patterns, where N is an integer greater than 1.

In a third implementation, when the quantity of TDD patterns included in the uplink-downlink TDD configuration is N, the second bit sequence is used to indicate UL transmission duration in a periodicity of a specified TDD pattern in the N TDD patterns, where N is an integer greater than 1.

In a fourth implementation, when the quantity of TDD patterns included in the uplink-downlink TDD configuration is N, a first part of bits in the second bit sequence are used to indicate a first TDD pattern in the N TDD patterns, and a second part of bits in the second bit sequence are used to indicate UL transmission duration in a periodicity of the first TDD pattern. Optionally, the UL transmission duration in the periodicity of the first TDD pattern is greater than UL transmission duration in a periodicity of a second TDD pattern, and the second TDD pattern is any one of the N TDD patterns except the first TDD pattern.

For specific indication methods of the four implementations, refer to the foregoing implementation performed on the first terminal device side. Details are not described herein again.

In an optional implementation, UL transmission duration in a periodicity of any one of the N TDD patterns is determined based on a ratio of a subcarrier spacing SCS of the S-SSB to a reference SCS included in the uplink-downlink TDD configuration.

In an optional implementation, UL transmission duration in a periodicity of any one of the N TDD patterns is determined based on a result of comparing a subcarrier spacing SCS of the S-SSB with an SCS threshold, the SCS threshold is related to a first quantity of bits, and the first quantity of bits is a quantity of bits used to indicate the UL transmission duration in the periodicity of the TDD pattern.

Figure 16:
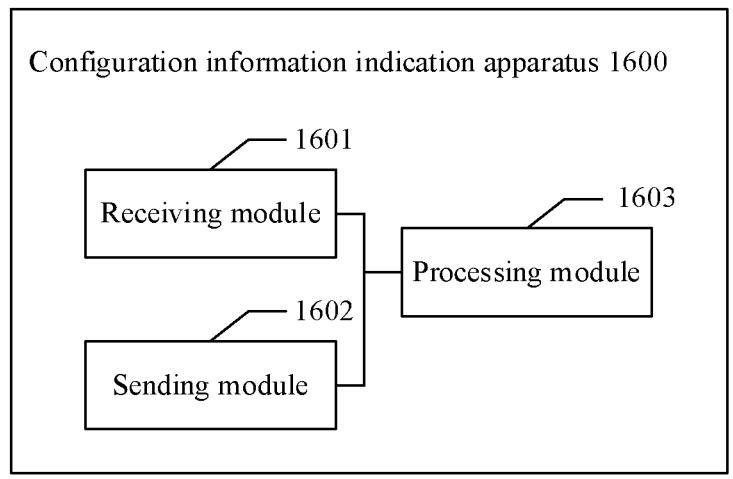
FIG. 16 is a schematic diagram of a structure of a configuration information indication apparatus according to an embodiment of this application.

Further, refer to FIG. 16. An embodiment of this application provides a configuration information indication apparatus 1600, including:

a receiving module 1601, configured to receive an uplink-downlink time division duplex TDD configuration from a network device; and a sending module 1602, configured to send indication information to a second terminal device based on the uplink-downlink TDD configuration, where the indication information is carried on a physical sidelink broadcast channel PSBCH of a sidelink synchronization signal block S-SSB, and the indication information is used to indicate periodicity information included in the uplink-downlink TDD configuration.

In this embodiment of this application, when indicating the uplink-downlink TDD configuration through the PSBCH of the S-SSB, a first terminal device also performs simplified indication on the uplink-downlink TDD configuration, that is, indicates the periodicity information included in the uplink-downlink TDD configuration. This can reduce signaling overheads in comparison with a case in which the uplink-downlink TDD configuration is directly sent.

In an optional implementation, the periodicity information includes a quantity of TDD patterns and/or a TDD pattern periodicity.

In an optional implementation, the indication information is further used to indicate UL transmission duration in the TDD pattern periodicity.

In an optional implementation, the indication information includes a first bit sequence, and the first bit sequence is used to indicate the TDD pattern periodicity.

In an optional implementation, the indication information includes a first bit sequence, a first part of bits in the first bit sequence are used to indicate the quantity of TDD patterns, and a second part of bits in the first bit sequence are used to indicate the TDD pattern periodicity.

In an optional implementation, the indication information includes a second bit sequence; and when the quantity of TDD patterns included in the uplink-downlink TDD configuration is 1, the second bit sequence is used to indicate UL transmission duration in a periodicity of the TDD pattern; or when the quantity of TDD patterns included in the uplink-downlink TDD configuration is N, the second bit sequence is used to indicate UL transmission duration in a periodicity of each of the N TDD patterns, where N is an integer greater than 1.

In an optional implementation, the indication information includes a second bit sequence; and when the quantity of TDD patterns included in the uplink-downlink TDD configuration is N, a first part of bits in the second bit sequence are used to indicate a first TDD pattern in the N TDD patterns, and a second part of bits in the second bit sequence are used to indicate UL transmission duration in a periodicity of the first TDD pattern.

In an optional implementation, the UL transmission duration in the periodicity of the first TDD pattern is greater than UL transmission duration in a periodicity of a second TDD pattern, and the second TDD pattern is any one of the N TDD patterns except the first TDD pattern.

In an optional implementation, the configuration information indication apparatus 1600 further includes:

a processing module 1603, configured to determine first UL transmission duration based on a ratio of a subcarrier spacing SCS of the S-SSB to a reference SCS included in the uplink-downlink TDD configuration, where the first UL transmission duration is UL transmission duration in a periodicity of any one of the N TDD patterns.

In another optional implementation, the configuration information indication apparatus 1600 further includes:

a processing module 1603, configured to: compare a subcarrier spacing SCS of the S-SSB with an SCS threshold, where the SCS threshold is related to a quantity of bits used to indicate first UL transmission duration, and the first UL transmission duration is UL transmission duration in a periodicity of any one of the N TDD patterns; and determine the first UL transmission duration based on a result of the comparison.

In an optional implementation, the processing module 1603 is further configured to:

when the SCS of the S-SSB is less than or equal to the SCS threshold, determine the first UL transmission duration based on a ratio of the SCS of the S-SSB to a reference SCS included in the uplink-downlink TDD configuration; or when the SCS of the S-SSB is greater than the SCS threshold, determine the first UL transmission duration based on a ratio of the SCS threshold to a reference SCS included in the uplink-downlink TDD configuration information.

In an optional implementation, the processing module 1603 is further configured to:

when the SCS of the S-SSB is greater than the SCS threshold, determine second UL transmission duration based on a ratio of the SCS of the S-SSB to a reference SCS included in the uplink-downlink TDD configuration information; and when the second UL transmission duration is greater than a time threshold, determine the first UL transmission duration based on the time threshold; or when the second UL transmission duration is less than or equal to a time threshold, determine the first UL transmission duration based on the second UL transmission duration, where the time threshold is maximum UL transmission duration that can be indicated by a bit used to indicate the first UL transmission duration.

In an optional implementation, the processing module 1603 is further configured to:

when the SCS of the S-SSB is greater than the SCS threshold, determine second UL transmission duration based on a ratio of the SCS of the S-SSB to a reference SCS included in the uplink-downlink TDD configuration;

scale down the second UL transmission duration based on a preset step; and determine the first UL transmission duration based on scaled-down second UL transmission duration.

Figure 17:
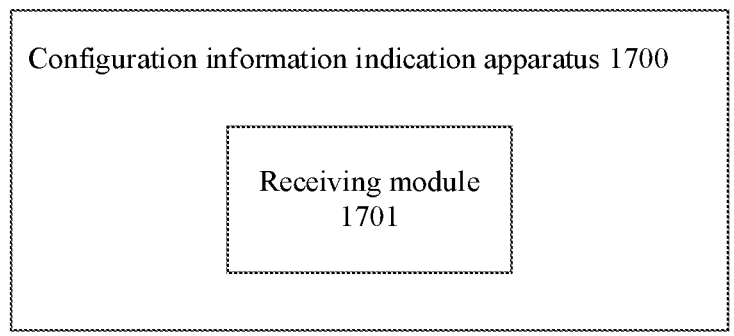
FIG. 17 is a schematic diagram of a structure of another configuration information indication apparatus according to an embodiment of this application.

Further, refer to FIG. 17. An embodiment of this application further provides a configuration information indication apparatus 1700. The apparatus 1700 includes:

a receiving module 1701, configured to receive indication information from a first terminal device, where the indication information is carried on a physical sidelink broadcast channel PSBCH of a sidelink synchronization signal block S-SSB, and the indication information is used to indicate periodicity information included in an uplink-downlink time division duplex TDD configuration received by the first terminal device.

In an optional implementation, the periodicity information includes a quantity of TDD patterns and/or a TDD pattern periodicity.

In an optional implementation, the indication information is further used to indicate UL transmission duration in the TDD pattern periodicity.

In an optional implementation, the indication information includes a first bit sequence, and the first bit sequence is used to indicate the TDD pattern periodicity.

In an optional implementation, the indication information includes a first bit sequence, a first part of bits in the first bit sequence are used to indicate the quantity of TDD patterns, and a second part of bits in the first bit sequence are used to indicate the TDD pattern periodicity.

In an optional implementation, the indication information includes a second bit sequence; and when the quantity of TDD patterns included in the uplink-downlink TDD configuration is 1, the second bit sequence is used to indicate UL transmission duration in a periodicity of the TDD pattern; or when the quantity of TDD patterns included in the uplink-downlink TDD configuration is N, the second bit sequence is used to indicate UL transmission duration in a periodicity of each of the N TDD patterns, where N is an integer greater than 1.

In an optional implementation, the indication information includes a second bit sequence; and when the quantity of TDD patterns included in the uplink-downlink TDD configuration is N, a first part of bits in the second bit sequence are used to indicate a first TDD pattern in the N TDD patterns, and a second part of bits in the second bit sequence are used to indicate UL transmission duration in a periodicity of the first TDD pattern.

In an optional implementation, the UL transmission duration in the periodicity of the first TDD pattern is greater than UL transmission duration in a periodicity of a second TDD pattern, and the second TDD pattern is any one of the N TDD patterns except the first TDD pattern.

In an optional implementation, UL transmission duration in a periodicity of any one of the N TDD patterns is determined based on a ratio of a subcarrier spacing SCS of the S-SSB to a reference SCS included in the uplink-downlink TDD configuration.

In an optional implementation, UL transmission duration in a periodicity of any one of the N TDD patterns is determined based on a result of comparing a subcarrier spacing SCS of the S-SSB with an SCS threshold, the SCS threshold is related to a first quantity of bits, and the first quantity of bits is a quantity of bits used to indicate the UL transmission duration in the periodicity of the TDD pattern.

Figure 18:
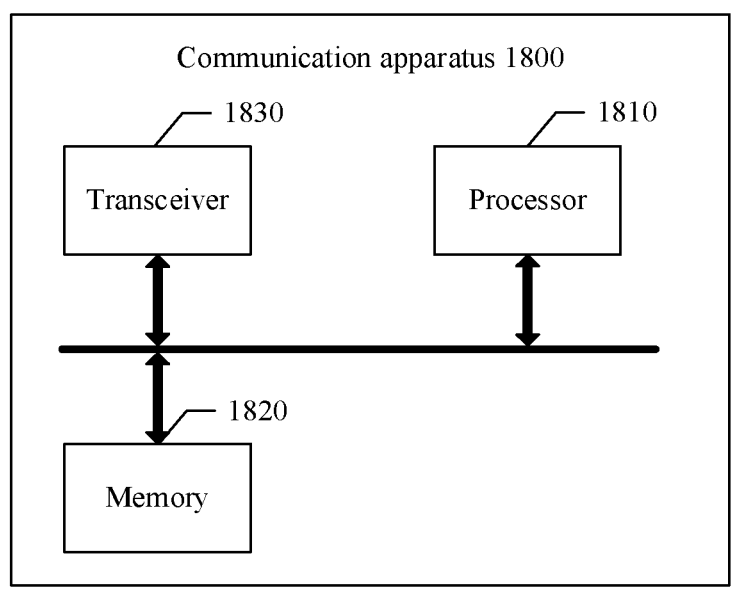
FIG. 18 is a schematic diagram of a structure of a communication apparatus according to an embodiment of this application.

Based on a same concept, FIG. 18 shows a communication apparatus 1800 provided in this application. For example, the communication apparatus 1800 may be a chip or a chip system. Optionally, in this embodiment of this application, the chip system may include a chip, or may include the chip and another discrete device.

The communication apparatus 1800 may include at least one processor 1810. The apparatus 1800 may further include at least one memory 1820, configured to store a computer program, program instructions, and/or data. The memory 1820 is coupled to the processor 1810. The coupling in this embodiment of this application is indirect coupling or a communication connection between apparatuses, units, or modules for information exchange between the apparatuses, the units, or the modules, and may be in electrical, mechanical, or other forms. The processor 1810 may cooperate with the memory 1820. The processor 1810 may execute the computer program stored in the memory 1820. Optionally, at least one of the at least one memory 1820 may be included in the processor 1810.

The communication apparatus 1800 may further include a transceiver 1830, and the communication apparatus 1800 may exchange information with another device by using the transceiver 1830. The transceiver 1830 may be a circuit, a bus, a transceiver, or any other apparatus that may be configured to exchange information.

In a possible implementation, the communication apparatus 1800 may be used in a first terminal device. Specifically, the communication apparatus 1800 may be the first terminal device, or may be an apparatus that can support the first terminal device in implementing a function of the first terminal device in any one of the foregoing embodiments. The memory 1820 stores a necessary computer program, program instructions, and/or data for implementing the function of the first terminal device in any one of the foregoing embodiments. The processor 1810 may execute the computer program stored in the memory 1820, to complete the method performed by the first terminal device in any one of the foregoing embodiments.

In a possible implementation, the communication apparatus 1800 may be used in a second terminal device. Specifically, the communication apparatus 1800 may be the second terminal device, or may be an apparatus that can support the second terminal device in implementing a function of the second terminal device in any one of the foregoing embodiments. The memory 1820 stores a necessary computer program, program instructions, and/or data for implementing the function of the second terminal device in any one of the foregoing embodiments. The processor 1810 may execute the computer program stored in the memory 1820, to complete the method performed by the second terminal device in any one of the foregoing embodiments.

In a possible implementation, the communication apparatus 1800 may be used in a network device. Specifically, the communication apparatus 1800 may be the network device, or may be an apparatus that can support the network device in implementing a function of the network device in any one of the foregoing embodiments. The memory 1820 stores a necessary computer program, program instructions, and/or data for implementing the function of the network device in any one of the foregoing embodiments. The processor 1810 may execute the computer program stored in the memory 1820, to complete the method performed by the network device in any one of the foregoing embodiments.

In this embodiment of this application, a specific connection medium between the transceiver 1830, the processor 1810, and the memory 1820 is not limited. In this embodiment of this application, the memory 1820, the processor 1810, and the transceiver 1030 are connected by using a bus in FIG. 18. The bus is represented by using a bold line in FIG. 18. A connection manner between other components is merely an example for description, and is not limited by reference. The bus may be classified into an address bus, a data bus, a control bus, and the like. For ease of representation, only one bold line is used to represent the bus in FIG. 18, but this does not mean that there is only one bus or only one type of bus.

In embodiments of this application, the processor may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in embodiments of this application. The general-purpose processor may be a microprocessor, any conventional processor, or the like. The steps of the methods disclosed with reference to embodiments of this application may be directly performed and completed by a hardware processor, or may be performed and completed by using a combination of hardware and software modules in the processor.

In embodiments of this application, the memory may be a non-volatile memory such as a hard disk drive (HDD) or a solid-state drive (SSD), or may be a volatile memory such as a random access memory (RAM). The memory may alternatively be any other medium that can carry or store expected program code in a form of an instruction structure or a data structure and that can be accessed by a computer, but is not limited thereto. The memory in embodiments of this application may alternatively be a circuit or any other apparatus that can implement a storage function, and is configured to store the computer program, the program instructions, and/or the data.

Figure 19:
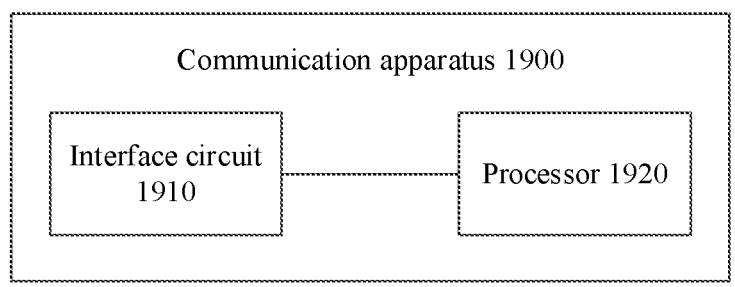
FIG. 19 is a schematic diagram of a structure of another communication apparatus according to an embodiment of this application.

Based on the foregoing embodiments, referring to FIG. 19, an embodiment of this application further provides another communication apparatus 1900, including an interface circuit 1910 and a processor 1920.

The interface circuit 1910 is configured to receive code instructions and transmit the code instructions to the processor.

The processor 1920 is configured to run the code instructions to perform the method performed by the first terminal device in any one of the foregoing embodiments or the method performed by the second terminal device in any one of the foregoing embodiments.

Based on the foregoing embodiments, an embodiment of this application further provides a readable storage medium. The readable storage medium stores instructions. When the instructions are executed, the method performed by the first terminal device in any one of the foregoing embodiments is implemented, or the method performed by the second terminal device in any one of the foregoing embodiments is implemented. The readable storage medium may include: any medium that can store program code, a USB flash drive, a removable hard disk, a read-only memory, a random access memory, a magnetic disk, or an optical disc.

A person skilled in the art should understand that embodiments of this application may be provided as methods, systems, or computer program products. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the methods, the devices (systems), and the computer program products according to embodiments of this application. It should be understood that computer program instructions may be used to implement each procedure and/or each block in the flowcharts and/or the block diagrams and a combination of the procedure and/or the block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

These computer program instructions may alternatively be loaded onto the computer or the another programmable data processing device, so that a series of operations and steps are performed on the computer or the another programmable device, to generate computer-implemented processing. Therefore, the instructions executed on the computer or the another programmable device provide steps for implementing a specific function in one or more procedures in the flowcharts and/or in one or more blocks in the block diagrams.

It is clear that a person skilled in the art can make various modifications and variations to embodiments of this application without departing from the scope of embodiments of this application. In this case, this application is intended to cover these modifications and variations of embodiments of this application provided that they fall within the scope of protection defined by the following claims and their equivalent technologies.

What is claimed is:

1. A method, comprising:
   receiving, by a first apparatus from a network device, an uplink-downlink time division duplex (TDD) configuration, wherein the uplink-downlink TDD configuration indicates a quantity of TDD patterns and a TDD pattern periodicity; and
   sending, by the first apparatus to a second apparatus, indication information based on the uplink-downlink TDD configuration, wherein the indication information is a bit sequence with 12 bits, the bit sequence comprises a first bit sequence and a second bit sequence, wherein a first part of bits in the first bit sequence indicates the quantity of the TDD patterns is 1 or 2, wherein a second part of bits in the first bit sequence indicates an index corresponding to the TDD pattern periodicity of a TDD pattern or an index corresponding to a periodicity combination of two TDD patterns, the second bit sequence indicates uplink (UL) transmission duration in the TDD pattern periodicity of each of the TDD patterns, and wherein the first part of bits in the first bit sequence is 1 bit, the second part of bits in the first bit sequence is 4 bits, and the second bit sequence is 7 bits.

2. The method according to claim 1, wherein the first part of bits in the first bit sequence indicates that the quantity of the TDD patterns is 1, wherein the TDD pattern is a pattern 1, wherein the index corresponding to the TDD pattern periodicity of the TDD pattern is an index corresponding to the periodicity of the pattern 1, and wherein the index has a relationship with the periodicity of the pattern 1 as follows:
   the second part of bits in the first bit sequence indicates the index is 0, and the periodicity is 0.5 ms,
   the second part of bits in the first bit sequence indicates the index is 1, and the periodicity is 0.625 ms,
   the second part of bits in the first bit sequence indicates the index is 2, and the periodicity is 1 ms,
   the second part of bits in the first bit sequence indicates the index is 3, and the periodicity is 1.25 ms,
   the second part of bits in the first bit sequence indicates the index is 4, and the periodicity is 2 ms, and
   the second part of bits in the first bit sequence indicates the index is 5, and the periodicity is 2.5 ms.

3. The method according to claim 1, wherein
   the first part of bits in the first bit sequence indicates that the quantity of the TDD patterns is 2, the TDD patterns are a pattern 1 and a pattern 2, and the index corresponding to the periodicity combination of the two TDD patterns is an index corresponding to a periodicity combination of a first periodicity P of the pattern 1 and a second periodicity $P_2$ of the pattern 2, and wherein the index has a relationship with the combination of the first periodicity P of the pattern 1 and the second periodicity $P_2$ of the pattern 2 as follows:
   the index is 0, the first periodicity P is 0.5 ms, and the second periodicity $P_2$ is 0.5 ms,
   the index is 1, the first periodicity P is 0.625 ms, and the second periodicity $P_2$ is 0.625 ms,
   the index is 2, the first periodicity P is 1 ms, and the second periodicity $P_2$ is 1 ms,
   the index is 3, the first periodicity P is 0.5 ms, and the second periodicity $P_2$ is 2 ms,
   the index is 4, the first periodicity P is 1.25 ms and the second periodicity $P_2$ is 1.25 ms,
   the index is 5, the first periodicity P is 2 ms, and the second periodicity $P_2$ is 0.5 ms,
   the index is 6, the first periodicity P is 1 ms, and the second periodicity $P_2$ is 3 ms,
   the index is 7, the first periodicity P is 2 ms, and the second periodicity $P_2$ is 2 ms,
   the index is 8, the first periodicity P is 3 ms, and the second periodicity $P_2$ is 1 ms,
   the index is 9, the first periodicity P is 1 ms, and the second periodicity $P_2$ is 4 ms,
   the index is 10, the first periodicity P is 2 ms, and the second periodicity $P_2$ is 3 ms,
   the index is 11, the first periodicity P is 2.5 ms, and the second periodicity $P_2$ is 2.5 ms,
   the index is 12, the first periodicity P is 3 ms, and the second periodicity $P_2$ is 2 ms,
   the index is 13, the first periodicity P is 4 ms, and the second periodicity $P_2$ is 1 ms,
   the index is 14, the first periodicity P is 5 ms, and the second periodicity $P_2$ is 5 ms, and
   the index is 15, the first periodicity P is 10 ms, and the second periodicity $P_2$ is 10 ms.

4. The method according to claim 1, wherein a value 0 of the first part of bits indicates that the quantity of the TDD patterns is 1, and wherein a value 1 of the first part of bits indicates that the quantity of the TDD patterns is 2.

5. The method according to claim 1,
wherein the quantity of the TDD patterns comprised in the uplink-downlink TDD configuration is 1, and the second bit sequence is a binary representation of a quantity of slots that corresponds to the UL transmission duration, or
wherein the quantity of the TDD patterns comprised in the uplink-downlink TDD configuration is 2, and the second bit sequence indicates the quantity of slots that corresponds to the UL transmission duration in a corresponding periodicity of each of the TDD patterns.

6. The method according to claim 1, wherein the indication information is carried on a physical sidelink broadcast channel (PSBCH) of a sidelink synchronization signal block (S-SSB), and wherein the UL transmission duration in the TDD pattern periodicity is related to a ratio of a subcarrier spacing (SCS) of the S-SSB to a reference SCS comprised in the uplink-downlink TDD configuration.

7. The method according to claim 6, wherein the SCS of the S-SSB is an SCS configured on a sidelink bandwidth part (BWP).

8. The method according to claim 1, wherein the indication information is carried on a physical sidelink broadcast channel (PSBCH) of a sidelink synchronization signal block (S-SSB).

9. An apparatus, comprising:
one or more processors, and
a non-transitory storage medium in communication with the one or more processors, wherein the non-transitory storage medium stores program instructions, and wherein, when executed by the one or more processors, the program instructions cause the apparatus to perform:
receiving, from a network device, an uplink-downlink time division duplex (TDD) configuration, wherein the uplink-downlink TDD configuration indicates a quantity of TDD patterns and a TDD pattern periodicity; and
sending, to a second apparatus, indication information based on the uplink-downlink TDD configuration, wherein the indication information is a bit sequence with 12 bits, the bit sequence comprises a first bit sequence and a second bit sequence, wherein a first part of bits in the first bit sequence indicates the quantity of the TDD patterns is 1 or 2, wherein a second part of bits in the first bit sequence indicates an index corresponding to the TDD pattern periodicity of a TDD pattern or an index corresponding to a periodicity combination of two TDD patterns, the second bit sequence indicates uplink (UL) transmission duration in the TDD pattern periodicity of each of the TDD patterns, and wherein the first part of bits in the first bit sequence is 1 bit, the second part of bits in the first bit sequence is 4 bits, and the second bit sequence is 7 bits.

10. The apparatus according to claim 9, wherein the first part of bits in the first bit sequence indicates that the quantity of the TDD patterns is 1, wherein the TDD pattern is a pattern 1, wherein the index corresponding to the TDD pattern periodicity of the TDD pattern is an index corresponding to the periodicity of the pattern 1, and wherein the index has a relationship with the periodicity of the pattern 1 as follows:
the second part of bits in the first bit sequence indicates the index is 0, and the periodicity is 0.5 ms,
the second part of bits in the first bit sequence indicates the index is 1, and the periodicity is 0.625 ms,
the second part of bits in the first bit sequence indicates the index is 2, and the periodicity is 1 ms,
the second part of bits in the first bit sequence indicates the index is 3, and the periodicity is 1.25 ms,
the second part of bits in the first bit sequence indicates the index is 4, and the periodicity is 2 ms, and
the second part of bits in the first bit sequence indicates the index is 5, and the periodicity is 2.5 ms.

11. The apparatus according to claim 9, wherein
the first part of bits in the first bit sequence indicates that the quantity of the TDD patterns is 2, the TDD patterns are a pattern 1 and a pattern 2, and the index corresponding to the periodicity combination of the two TDD patterns is an index corresponding to a periodicity combination of a first periodicity P of the pattern 1 and a second periodicity $P_2$ of the pattern 2, and wherein the index has a relationship with the combination of the first periodicity P of the pattern 1 and the second periodicity $P_2$ of the pattern 2 as follows:
the index is 0, the first periodicity P is 0.5 ms, and the second periodicity $P_2$ $_{is}$ 0.5 ms,
the index is 1, the first periodicity P is 0.625 ms, and the second periodicity $P_2$ is 0.625 ms,
the index is 2, the first periodicity P is 1 ms, and the second periodicity $P_2$ is 1 ms,
the index is 3, the first periodicity P is 0.5 ms, and the second periodicity $P_2$ is 2 ms,
the index is 4, the first periodicity P is 1.25 ms, and the second periodicity $P_2$ is 1.25 ms,
the index is 5, the first periodicity P is 2 ms, and the second periodicity $P_2$ is 0.5 ms,
the index is 6, the first periodicity P is 1 ms and the second periodicity $P_2$ is 3 ms,
the index is 7, the first periodicity P is 2 ms, and the second periodicity $P_2$ is 2 ms,
the index is 8, the first periodicity P is 3 ms, and the second periodicity $P_2$ is 1 ms,
the index is 9, the first periodicity P is 1 ms, and the second periodicity $P_2$ is 4 ms,
the index is 10, the first periodicity P is 2 ms, and the second periodicity $P_2$ is 3 ms,
the index is 11, the first periodicity P is 2.5 ms, and the second periodicity $P_2$ is 2.5 ms,
the index is 12, the first periodicity P is 3 ms, and the second periodicity $P_2$ is 2 ms,
the index is 13, the first periodicity P is 4 ms, and the second periodicity $P_2$ is 1 ms,
the index is 14, the first periodicity P is 5 ms, and the second periodicity $P_2$ is 5 ms, or
index is 15, the first periodicity P is 10 ms, and the second periodicity $P_2$ is 10 ms.

12. The apparatus according to claim 9, wherein a value 0 of the first part of bits indicates that the quantity of the TDD patterns is 1, and wherein a value 1 of the first part of bits indicates that the quantity of the TDD patterns is 2.

13. The apparatus according to claim 9, wherein the quantity of the TDD patterns comprised in the uplink-downlink TDD configuration is 1, and the second bit sequence is a binary representation of a quantity of slots that corresponds to the UL transmission duration, or
wherein the quantity of the TDD patterns comprised in the uplink-downlink TDD configuration is 2, and the second bit sequence indicates the quantity of slots that corresponds to the UL transmission duration in a corresponding periodicity of each of the TDD patterns.

14. The apparatus according to claim 9, wherein the indication information is carried on a physical sidelink broadcast channel (PSBCH) of a sidelink synchronization signal block (S-SSB), and wherein the UL transmission duration in the TDD pattern periodicity is related to a ratio of a subcarrier spacing (SCS) of the S-SSB to a reference SCS comprised in the uplink-downlink TDD configuration.

15. The apparatus according to claim 14, wherein the SCS of the S-SSB is an SCS configured on a sidelink bandwidth part (BWP).

16. The apparatus according to claim 9, wherein the indication information is carried on a physical sidelink broadcast channel (PSBCH) of a sidelink synchronization signal block (S-SSB).

* * * * *